United States Patent
Robinson et al.

(10) Patent No.: US 12,454,126 B2
(45) Date of Patent: Oct. 28, 2025

(54) HEAT TRANSFER PRESS PROJECTION ALIGNMENT SYSTEM AND METHOD

(71) Applicant: Stahls' Inc., St. Clair Shores, MI (US)

(72) Inventors: Benjamin B. Robinson, Smithfield, PA (US); Weiyu Zhang, Pittsburgh, PA (US); Shubham Saha, Morgantown, WV (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 17/854,896

(22) Filed: Jun. 30, 2022

(65) Prior Publication Data

US 2023/0391068 A1    Dec. 7, 2023

Related U.S. Application Data

(60) Provisional application No. 63/348,634, filed on Jun. 3, 2022.

(51) Int. Cl.
  *B41F 17/00* (2006.01)
  *B41F 16/00* (2006.01)

(52) U.S. Cl.
  CPC ............ *B41F 17/003* (2013.01); *B41F 16/00* (2013.01)

(58) Field of Classification Search
  CPC ............................... B41F 17/003; B41F 16/00
  See application file for complete search history.

(56) References Cited

U.S. PATENT DOCUMENTS

| | | | |
|---|---|---|---|
| 3,154,009 A | | 10/1964 | Dewyer |
| 3,472,589 A | * | 10/1969 | Field ................... G03B 21/132 353/100 |
| 3,807,847 A | * | 4/1974 | Okano ................... G03B 21/06 353/71 |
| 3,941,463 A | * | 3/1976 | Wetzel ................... G03B 33/00 352/50 |
| 4,124,285 A | * | 11/1978 | Johnson ................. A41H 3/007 700/135 |
| 4,152,193 A | | 5/1979 | Fitzwater |

(Continued)

FOREIGN PATENT DOCUMENTS

| | | |
|---|---|---|
| CN | 107139579 A | 9/2017 |
| EP | 3501827 A2 | 6/2019 |
| GB | 1079431 A | 8/1967 |

OTHER PUBLICATIONS

Extended European Search Report, EP23176914.2, dated Nov. 2, 2023.

(Continued)

*Primary Examiner* — Jill E Culler

(74) *Attorney, Agent, or Firm* — Bodman PLC

(57) ABSTRACT

A transfer press for applying a transfer to a garment includes an upper platen, a lower platen, a support head adapted to move the upper platen between an open position and a closed position, to apply heat to at least one of the upper platen and the lower platen to apply a transfer to a garment positioned on the lower platen, and a support arm assembly. The projection assembly is attached to the support arm assembly and extends above the lower platen, the projection assembly having a projector positioned to project an image to the lower platen, the image selected to match in size with the transfer to be applied to the garment, to guide a user where to place the transfer onto the garment.

20 Claims, 14 Drawing Sheets

(56) References Cited

U.S. PATENT DOCUMENTS

| | | | | |
|---|---|---|---|---|
| 4,774,778 | A * | 10/1988 | Williams | D05C 9/04 |
| | | | | 38/102.2 |
| 5,252,171 | A | 10/1993 | Anderson | |
| 5,408,938 | A | 4/1995 | Genest | |
| 5,638,154 | A * | 6/1997 | Chmielnik | B41F 27/005 |
| | | | | 355/77 |
| 7,196,290 | B2 | 3/2007 | Oliver | |
| 7,241,981 | B2 * | 7/2007 | Hofmann | A43D 95/14 |
| | | | | 353/122 |
| 8,573,551 | B2 * | 11/2013 | Hung | G03B 21/145 |
| | | | | 248/323 |
| 8,978,551 | B2 * | 3/2015 | Miller | B41J 3/28 |
| | | | | 101/485 |
| 9,573,332 | B2 | 2/2017 | Robinson | |
| 10,493,713 | B2 | 12/2019 | Robinson | |
| 10,675,860 | B2 * | 6/2020 | Drees | B41F 16/02 |
| 2005/0278984 | A1 | 12/2005 | Kenney | |
| 2011/0076079 | A1 | 3/2011 | Robinson | |
| 2013/0233493 | A1 | 9/2013 | Robinson | |
| 2015/0283776 | A1 | 10/2015 | Robinson | |
| 2018/0036980 | A1 * | 2/2018 | Robinson | B41F 16/0046 |

OTHER PUBLICATIONS

Extended European Search Report, EP23176959.7, dated Nov. 7, 2023.

* cited by examiner

HEAT TRANSFER PRESS PROJECTION ALIGNMENT SYSTEM AND METHOD

CROSS-REFERENCE TO RELATED APPLICATIONS

This application claims priority to U.S. Provisional Patent Application No. 63/348,634, filed Jun. 3, 2022, the contents of which are incorporated herein by reference in their entirety.

TECHNICAL FIELD

The exemplary illustrations described herein are generally directed to presses, such as heat transfer presses that include one or more positioning arms for aligning transfers on an item prior to pressing the item to a fabric.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. Graphic images and lettering may generally be accurately and quickly transferred to the apparel without bleeding or partial interruptions in the bonding of the transfer, as long as the presses can be operated at a predetermined temperature for a predetermined time and at a predetermined pressure.

The presses must be able to accommodate many variations in the arrangement of transfers and apparel, as well as the types of transfers and apparel materials available. Moreover, the presses accommodate a wide variety of temperatures, pressures, and time intervals associated with application of indicia to a garment. Due to the desire for flexibility and economic factors, presses have traditionally been manually operated, i.e., they often rely on a user (e.g., an operator) to control at least (a) the force applied through the platens and (b) the length of time the force is applied with a mechanical apparatus.

The accuracy and precision of the temperature, and the pressure and the time duration for which these parameters are applied to the transfers are particularly important to complete an efficient bonding of the transfers to materials, and can be difficult to accomplish in an accurate and repeatable manner. In particular, depending upon materials and the structure of the indicia to be applied to the apparel, indicia may be subject to inconsistent application conditions throughout the surface of apparel to which the transfer is applied. For example, the application of excessive pressure between the platen pressing surfaces may cause bleeding of the colors, while insufficient pressure may result in blotched or unattached areas where the indicia failed to adhere completely to the garment.

In addition, it is important to properly place transfers onto a shirt, fabric, or other item for proper alignment and positioning thereon. However, given the vast numbers of materials, designs, shapes, textures, thicknesses, and makeup of the myriad transfers that are used, it is important that they be positioned and centered better than just simply by "eyeball" or by estimating where they need to be positioned by an operator. Some known systems provide projection fiducials or cross-hairs for location of a transfer onto a garment, but such systems may be limited in scope for positioning of transfers onto garments.

Accordingly, there is a need to improve positioning of transfers on fabrics to account for the myriad types and designs used in heat transfer presses.

BRIEF DESCRIPTION

According to the disclosure, a transfer press for applying a transfer to a garment includes an upper platen, a lower platen, a support head adapted to move the upper platen between an open position and a closed position, to apply heat to at least one of the upper platen and the lower platen to apply a transfer to a garment positioned on the lower platen, and a support arm assembly. The projection assembly is attached to the support arm assembly and extends above the lower platen, the projection assembly having a projector positioned to project an image to the lower platen, the image selected to match in size with the transfer to be applied to the garment, to guide a user where to place the transfer onto the garment.

Also according to the disclosure, a method of applying a transfer to a garment includes selecting a image from a database that matches with a transfer that is to be applied to a garment that is positioned on a lower platen, projecting the image toward the lower platen and from a projection head that is positioned above the lower platen, such that a transfer is positionable to match with a location and size of the image on the garment, to guide a user where to place the transfer onto the garment, moving an upper platen to above the lower platen, and closing the upper platen to the lower platen from an open position to a closed position, to apply heat to at least one of the upper platen and the lower platen to apply the transfer to the garment positioned on the lower platen.

A method of applying a transfer to a garment includes selecting an image from a database that matches with a transfer that is to be applied to a garment that is positioned on a lower platen, projecting the image toward the lower platen and from a projection assembly that extends above the lower platen, such that a first transfer is positionable to match with a location and size of the image on the first garment, to guide a user where to place the transfer onto the garment, and moving an upper platen to above the lower platen. The method includes closing the upper platen to the lower platen from an open position to a closed position, to apply heat to at least one of the upper platen and the lower platen to apply the transfer to the garment positioned on the lower platen.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the disclosed subject matter described herein is not intended to be exhaustive or otherwise limiting or restricting to the precise form and configuration shown in the drawings and disclosed in the following detailed description. Examples of the present disclosed subject matter are described in detail by referring to the drawings as follows.

DETAILED DESCRIPTION

Figure 1A:
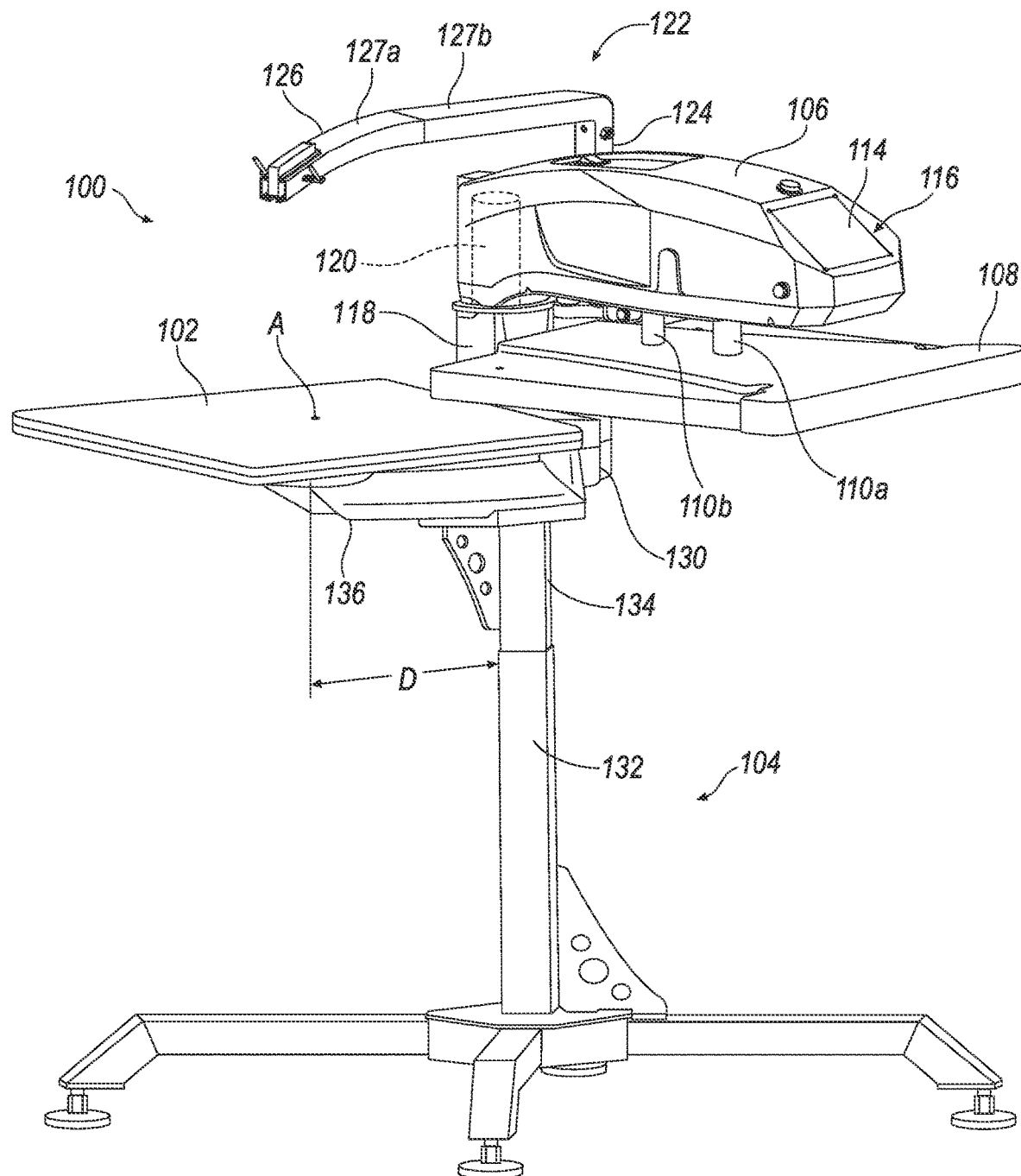
FIG. 1A is a lateral perspective view of an exemplary press with a support head rotated away from a lower platen and an adjustable height.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the disclosure to the precise form and configuration shown in the drawings and disclosed in the following detailed description.

Various exemplary illustrations are provided herein of exemplary presses, e.g., for applying indicia to garments by application of heat. According to one exemplary illustration, a press may include an upper platen, and with a lower platen disposed below and generally alignable with the upper platen. The press may further be adapted to move the upper platen between an open position over the lower platen, wherein the upper and lower platens are spaced away from one another, and a closed position, wherein the upper platen is pressed against the lower platen. In an example where more than one press is included, the upper platen is moveable from one lower platen to the other, and back and forth. The exemplary presses may further include a stand positioned on a ground surface or a table surface, and defining a throat spacing beneath the lower platen, the stand being spaced horizontally away from a geometric center of the lower platen. In some examples, the stand is adjustable between a plurality of heights. According to the disclosure, an alignment system includes a projection arm positioned over the lower platen or each of the platens, having access to a database of transfer types via a computer network, the database including optical images that may be selected by a user and projected to the lower platen or platens to correspond with a transfer being applied or heat pressed onto a fabric or shirt, and providing exact positional requirements to the user to avoid errors in placement.

Figure 1B:
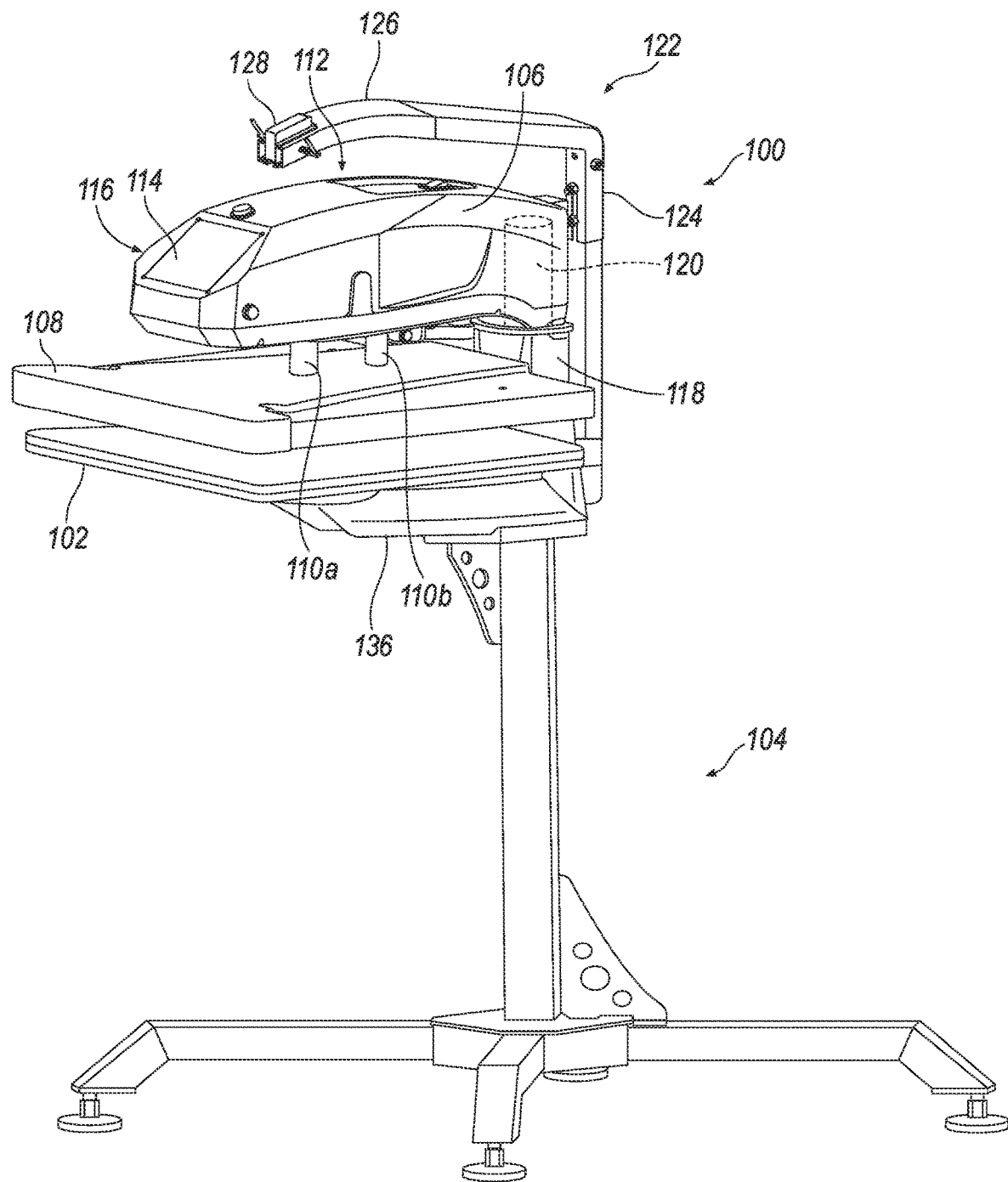
FIG. 1B is a lateral perspective view of the press shown in FIG. 1A but without the adjustable height, as an example.

Referring now to FIGS. 1A and 1B, an exemplary transfer press 100 is shown. Transfer press 100 includes a lower platen 102 mounted on a stand 104 or base frame, and a support head 106 supporting an upper platen 108 above lower platen 102. Force is applied to upper platen 108 through a pair of shafts 110a, 110b. The mechanism for displacing the upper platen to impart a force to the lower platen 102 may include a pneumatic pressure chamber 112 (not visible) within support head 106. In one example, platens 102, 108 include a generally flat plate of a press configured to press a material, e.g., a garment, to allow placement of a transfer on the garment.

Support head 106 positions and rotates upper platen 108 in a substantially parallel alignment with lower platen 102 as it approaches a closed position. Moreover, the closed position of the upper platen 108 can be varied, e.g., to raise the level of upper platen 108 with respect to lower platen 102. As a result, regardless of the thickness of the material, the transfers to be applied, or the thickness of the support pads to be used between upper and lower platens 108, 102, alignment of upper and lower platens 108, 102 avoids uneven pinching of the material and the transfers positioned between upper and lower platens 108, 102. Pads (not shown) may also assist the pressure distribution regardless of irregularities in the thicknesses of the heat applied transfers and the apparel to which it is applied.

At least one of the platens, e.g., upper platen 108 and or lower platen 102, includes a heating element (not shown) such as conventional electrically resistive heating elements and the like, which may be formed as serpentine or otherwise wound throughout the surface area of upper platen 108. The heating element is coupled to a typical power supply through a switch and/or a controller 116, and may be configured for adjusting the temperature of the heating element, e.g., by way of controller 116. Controller 116 may be positioned within support head 106 or may be positioned external thereto (not shown). Further, the temperature of the heating element may be adjusted at a visual display 114 which interfaces with controller 116 and/or the computer network as will be further illustrated and described in FIG. 6. Upper platen 108 may also carry a thermo-couple sensor (not shown) which is wired in a conventional manner to generate temperature information for the controller, which may display such information via visual display 114. Visual display 114 may thus be mounted for exposure to an area occupied by a press operator as typically positioned for manipulating and controlling the press, e.g., as best seen in FIG. 1B. The electrical circuit for the heating element may also include a temperature control such as a thermostat.

Figure 6:
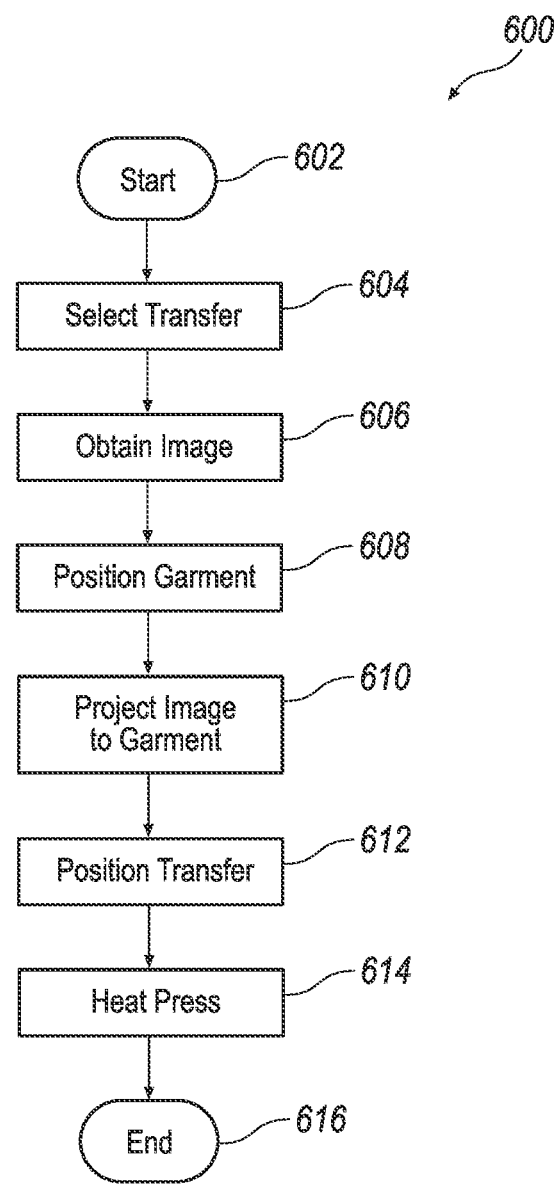
FIG. 6 is a block diagram illustrating steps to position and press a transfer to a shirt.

Controller 116 generally includes computational and control elements (e.g., a microprocessor or a microcontroller), and may generally provide time monitoring, temperature monitoring, pressure monitoring, and control, as examples. Display 114 further includes various readout displays, e.g., to allow display of a force, temperature, or time associated with operation of the press. Display 114 allows for manipulation of controller 116 by a user, e.g., by way of a touchscreen interface. Display 114 may thereby be used by the operator to adjust an amount of force applied by upper platen 108 to lower platen 102, a cycle time for the force to be applied, and a temperature of the heated platen(s), as examples. Controller 116 may operate transfer press 100 in an automated mode to include pressure, temperature, power, and time settings, as examples, for a given application. Data may be heuristically obtained for, for instance, a given apparel and transfer design. Best practices are employed based on experience obtained in some locations or with one transfer press, as examples, and applied to other transfer presses, apparel designs, transfers, and at other locations. Statistical data is accumulated in, for instance, a database affiliated with the computer network (as illustrated in FIG. 6), and best practices from the heuristic data are accumulated, analyzed, and optimized in order that settings may be collectively improved based on what is learned from other applications, locations, etc. and applied to other locations via the computer network. Respective settings may be selected via use of display 114. Such data may thereby be accessible via the network by users at different locations from where any data is gathered.

Controller 116 may facilitate a variety of user-customized settings for use of the press. In one exemplary illustration, controller 116 includes a memory for storing one or more programs associated with application of an indicia to a garment, including a predetermined temperature, a predetermined force, and/or a predetermined cycle time associated with upper platen 108. In another exemplary illustration, the programs may include a plurality of stages in the application process, e.g., where the upper platen 108 is applied to a garment with a first pressure that is applied to a garment for a first cycle time, and a second pressure that is subsequently applied for a second cycle time. In some examples, the pressure and cycle time are different, such that a variety of different pressures and cycle times may be applied by the transfer press 100.

Support head 106 generally supports and aligns upper platen 108 with respect to lower platen 102. Support head 106 may also be pivotable about an axial support 118, away from lower platen 102, to allow placement of a garment or shirt upon lower platen 102. In this press example, support head 106 may generally pivot about a pivot shaft 120 disposed within axial support 118. Support head 106 may include a drive chain or belt which is rotated by a motor disposed within support head 106, thereby rotating support head 106 about pivot shaft 120. The motor may be controlled by way of controller 116.

Pressure chamber 112 may be employed to selectively move upper platen 108 with respect to lower platen 102, thereby selectively imparting a force against lower platen 102. Pressure chamber 112 may be controlled by any pressure regulating device that is convenient. In one example an electric pressure (EP) Regulator is in communication with controller 116 and pressure chamber 112 may facilitate movement of shaft(s) 110a, 110b of upper platen 108. In one exemplary illustration, the EP regulator is an SMC ITV 1050 regulator.

The various components that facilitate automated operation of transfer press 100 may generally be integrated into support head 106. For example, support head 106 may include therein display 114, controller 116, pressure chamber 112, and the motor and drive belt. Accordingly, support head 106 may generally house the main components of transfer press 100 that provide automated operation of transfer press 100. Controller 116 may generally control heating, setting and monitoring of the application pressure, monitoring system health, interpreting touchscreen inputs, and optimizing system operation, all while supervising numerous other system operations simultaneously.

Controller 116 may include a memory, having the ability to store a large number of application programs and, by being connected to the computer network, has access to a database that contains a large number of application programs or "recipes" that may be stored, not only for application parameters, but of the images of the transfers as well. Accordingly, setup time is reduced and consistency is improved since human error is eliminated for the various steps, including positioning of the transfer onto the garment.

More specifically, by automatically setting and monitoring the pressure during each step, e.g., as supplied by pressure chamber 112, the operator generally does not have to worry about varying fluctuations in a power supply to support head 106, inputting errors on time, temperature, or pressure, or for placement of the transfer on the garment. Moreover, pressure chamber 112 also removes one source of potential error as a result of any inconsistent pressure supplied by the operator. In one exemplary illustration, an air compressor (not shown in the Figures) may be used to supply compressed air to pressure chamber 112, which is used to manipulate upper platen 108 downward against lower platen 102, e.g., to apply heat to a garment/indicia assembly. Controller 116 may automatically compensate for any changes or inconsistencies in the air supply to pressure chamber 112, and it may also alert the operator of any problems, e.g., insufficient, or total loss of supplied air pressure. Operator fatigue is also significantly reduced by eliminating the stress of constantly adjusting the press to provide the proper pressure, e.g., via pressure valves or levers, since the only inputs to transfer press 100 are generally via touchscreen display 114.

As noted above, controller 116 may be configured to pivot support head 106 about axial support 118. Accordingly, the operation of transfer press 100 may be integrated with the pivoting of support head 106 before and/or after upper platen 108 is forced against lower platen 102. The ability to apply upper platen 108 for a predetermined pressure and time may thus be combined with the ability to retract and swing support head 106 out of the way in a synchronous fashion. The time saved in each print may only be seconds, but in a continuous operation these seconds quickly multiply into saved hours associated with a given job. Moreover, operator fatigue is further reduced by eliminating the need to manipulate the press manually.

Controller 116 may also include a standardized interface (not shown) to allow for system upgrades in the field, e.g., a USB interface. Controller 116 may also allow for multiple levels of user access, e.g., to allow setting limits on a maximum pressure or temperature to be provided by the platen(s). Also, controller 116 may be supplied power via a universal A/C input range of 100-240 VAC at 50/60 Hz.

Still referring to FIGS. 1A and 1B, transfer press 100 includes a support arm assembly 122 that includes a first support 124 and an extension 126. First support 124 includes an adjustment mechanism 129 that may include, in one example, a set of screws that, when loosened, allow for axial extension and contraction so that extension 126 may be raised and lowered. Extension 126 may be a fixed length or may be telescopically extendible via two separate components of extension 126: first extension 127a and second extension 127b, so that a projection head 128 may be extendible, in a generally horizontal direction, over lower platen 102. Extension 126 is illustrated as having a general curvature so that projection head 128 is facing directly downward and toward lower platen 102, but in another example extension 126 may be any shape, such as straight or linear, in which case projection head 128 may be rotated so that it accomplishes the same purpose of facing directly downward and onto lower platen 102, generally orthogonal to lower platen 102. In one example, extension 126 is square or rectangular in shape to provide both good stiffness as well as ease of assembly.

First support 124 may be hard-mounted directly to a base support 130 and supported by stand 104, or may be otherwise attached thereto such as colinear with pivot shaft 120. However, if so attached, in one example first support 124 remains stationary and positioned with projection head 128 above lower platen 102, even during rotational motion of upper platen 108 and support head 106 as discussed above.

Stand 104 may be vertically adjustable by way of a telescoping receiver tube 132, as illustrated in FIG. 1A, or may be a fixed height and without adjustment as in FIG. 1B. For example, in FIG. 1A receiver tube 132 may generally receive an insert tube 134 which is attached to a support 136 of transfer press 100, which as illustrated may be a swinger-type or rotatable press. Support 136 may extend generally horizontally beneath lower platen 102. Support 136 thereby provides a relatively wide support that allows receiver tube 132 and insert tube 134 of stand 104 to be spaced horizontally away from lower platen 102. An associated support of lower platen 102 may be relatively narrow, thereby defining a "throat spacing" that is narrow enough to allow garments to be "threaded" over lower platen 102 during operation. Accordingly, the shifted position of lower platen 102 horizontally with respect to stand 104, and in particular insert tube 134 and receiver tube 132 which include the primary support member of stand 104, in combination with a relatively narrow throat spacing, generally creates space around lower platen 102 that allows garments to be threaded over lower platen 102.

As noted above, stand 104 may be an adjustable, e.g., telescoping, stand that allows transfer press 100 to be moved upwards and downwards. As transfer press 100 may be relatively heavy, stand 104 may include a resistance mechanism that generally allows for easier movement of stand 104 up and down. In one example, transfer press 100 may be adjusted upwards and downwards between a lower position where lower platen 102 is, in one example, approximately 37 inches above ground level, and an upper position in which lower platen 102 is, in this example, approximately 44 inches above ground level. This exemplary range of adjustment may allow positioning of lower platen 102 approximately at the beltline of nearly all adult operators, e.g., as may be required for operating the press 100. In another exemplary illustration, the adjustment spans a range of approximately 18 inches. The assist spring force may be varied to match the particular press employed. In one example, the spring provides a maximum spring/assist force of approximately 100 pounds, corresponding to slightly less than an overall weight of the press 100 supported by stand 104.

Such vertical motion of stand 104 may be particularly convenient for an operator employing the disclosed transfer positioning so that a height of projection head 128 can be moved vertically and in conjunction with the overall transfer press 100, including lower platen 102, upper platen 108, and support head 106. That is, stand 104 may have a generally vertical orientation, i.e., where receiver tube 132 and insert tube 134 are each generally vertical. Such a vertical orientation may facilitate adjustment of stand 104 upwards and downwards by reducing friction between insert tube 134 and receiver tube 132.

Exemplary press stands may be employed with any type of press that is convenient. For example, as described above and illustrated in FIGS. 1A and 1B, a swinger-type or rotatable press may be used where upper platen 108 generally rotates or "swings" horizontally with respect to lower platen 102. In another exemplary illustration, a clam-type press (not shown) may be used where upper platen 108 rotates or swings vertically away from lower platen 102 and may employ support arm assembly 122 in a similar fashion as described above, so long as projection head 128 is positionable above lower platen 102.

Thus, an "open throat" design is provided by the vertical spacing of stand 104 with respect to lower platen 102, the elevation of lower platen 102 from an associated ground surface or tabletop surfaces (not shown), and a relatively narrow horizontal support plate 136 supporting lower platen 102 generally allows garments to be "threaded" over lower platen 102. For example, a shirt may be threaded over lower platen 102 due to the horizontal or lateral offset between stand 104 and with respect to a geometric center A of lower platen 102. Accordingly, a shirt or garment may be "threaded" over lower platen 102, so that a portion of the shirt may be positioned on lower platen 102 for applying an indicia or design.

According to the disclosure, rather than employing the disclosed support arm assembly 122 in a single-press implementation (FIGS. 1A and 1B), it is contemplated that more than one support arm assembly 122 may be used as well, such as in a dual press design that may be placed on, for instance, a tabletop.

Figure 2:
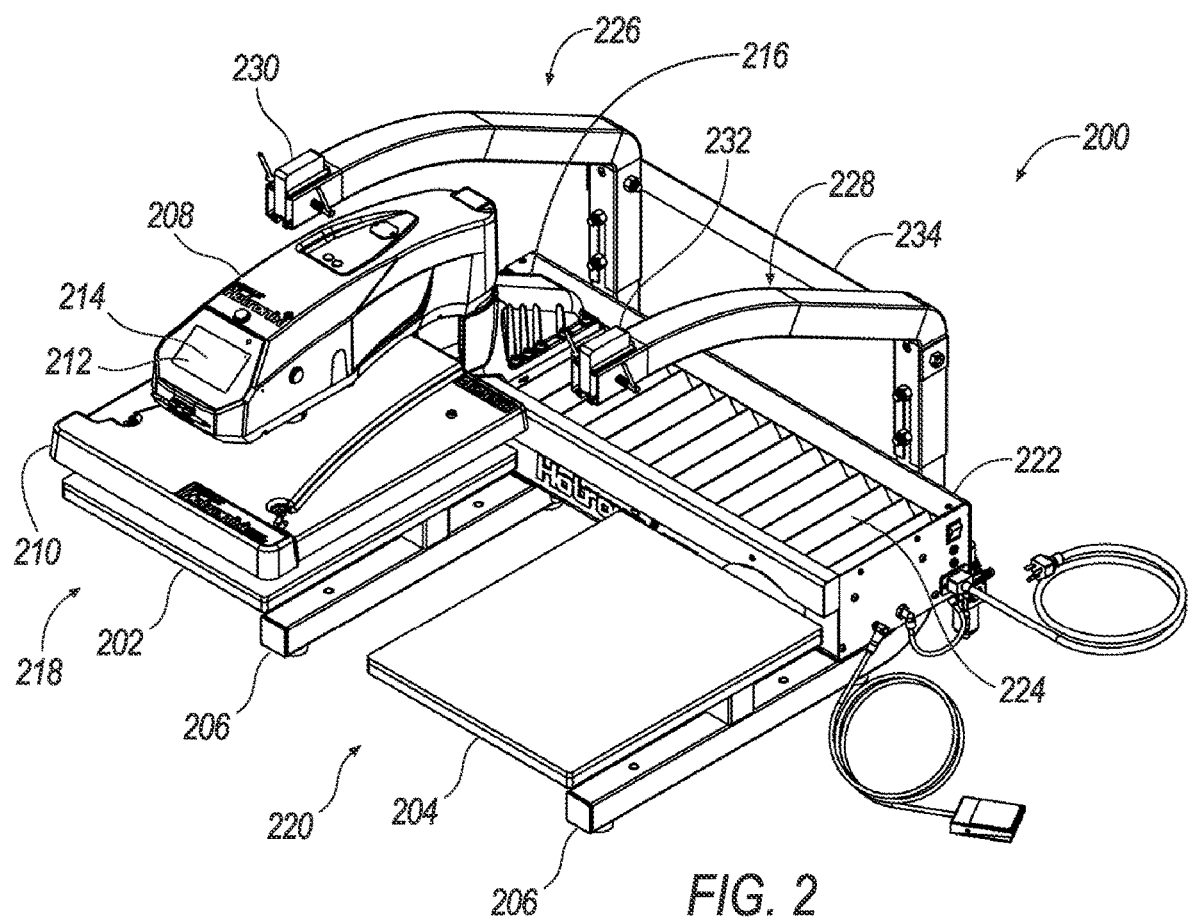
FIG. 2 is a perspective view of a dual press having projector arms over each press.

FIG. 2 is a perspective view of a dual press 200 or two-platen design having projector arms over each press, and FIG. 3 is a perspective view of the dual press 200 of FIG. 2 being repositioned from one side to the other. Having two platens, press 200 otherwise operates having upper and lower platens, a controller, heating elements, etc. . . . as described in the above single platen designs (as described in FIGS. 1A and 1B), and the above description for FIGS. 1A and 1B is incorporated into the following description—noting the difference between stand 104 and a support base for press 200. Press 200 otherwise operates in the same fashion, having automated control of temperature, pressure, and time of operation as described above with respect particularly to press 100 of FIGS. 1A and 1B. In addition, the upper platen and support head are movable left to right, so that a garment and transfer can be placed onto one lower platen while a transfer is being affixed to a garment via the heat press on the other lower platen, with the process repeating back and forth.

Press 200 includes a first lower platen 202 and a second lower platen 204 mounted on a stand 206 or base frame, and a support head 208 supporting an upper platen 210 above lower platens 202, 204. Force may be applied to upper platen 210 through a pair of shafts, and the mechanism for displacing the upper platen to impart a force to lower platens 202, 204 may include a pneumatic pressure chamber, as similarly described and illustrated in FIGS. 1A and 1B.

Operation of press 200 is carried out in a fashion similar to that of press 100 described above. However, in addition, support head 208 may be moved and positioned over each of lower platens 202, 204 using a controller 212 and a visual display 214 which interfaces with controller 212. Upper platen 210 is supported by a linearly moveable support structure 216, moveable from a first position 218 over lower platen 202, to a second position 220 over lower platen 204. Moveable support structure 216 is positioned within a containment structure 222 having a bellows-like flexible protective device 224, to either side of moveable support structure 216, which flexes and retracts in an accordion-like fashion as moveable support structure 216 is moved to left and right. Contained within containment structure 222 is an electric motor or pneumatic actuator (not visible) controlled by controller 212, operable to move support structure 216 between first position 218 and second position 220. Each of first and second positions 218, 220 includes its own corresponding support arm assembly 226, 228, corresponding generally in operation as described above with respect to support arm assembly 122.

As such, support arm assembly 226 includes a projection head 230 and support arm assembly 228 includes a projection head 232. In one example, an optional support beam 234 is positioned between support arm assemblies 226, 228 to provide additional structural support. Each projection head 230, 232 is attached to a respective extension and positioned to project an image from the projection head to the respective lower platen, the image selected to match in size with a transfer to be applied to the garment, to guide a user where to place the first transfer onto the garment.

Thus, in operation, controller 212 causes moveable support structure 216 to move left to right, and vice versa, between first position 218 and second position 220. When at one of the positions 218 and 220, controller 212 causes an automated press operation to apply a set amount of heat to be applied, with a given pressure, and for a set duration of time. Meanwhile, at the other of the positions 218 and 220, a user removes a shirt that has just been pressed having a transfer attached, and the user places a new shirt and positions a transfer on top of the shirt, using corresponding projection heads 230, 232 accordingly.

Each of the disclosed presses includes a controller, operable as described below. As in FIGS. 1A and 1B, transfer press 100 includes controller 116 and in FIG. 2 transfer press 200 includes controller 212. Controller 212 includes further features to control the left to right motion and the operation of both projection heads 230, 232 and all additional features incumbent upon operating a dual press as opposed to a single press, including automatically switching projection from one projection head to the other during the shifting operation between left and right.

An operator may have an indicia or transfer to be applied to a garment and, according to the disclosure may obtain an image of the transfer via a database that is part of controller 116/212, or may be from a remote database and via a computer network that is external to controller 116/212 and remote to transfer press 100/200. In one example, an image corresponding with the transfer to be adhered to a garment may be provided separately, such with the garment itself, and such as on a thumb drive, jump drive, data stick, USB (Universal Serial Buss) key, and the like. In this example, the image and other instructions may provide reference features that project to the lower platen to guide placement of the garment, and then concurrently a location for the transfer itself on the garment (and with respect to the reference features) are also included. Once the image and reference features are obtained, according to the disclosure the references features are projected to the lower platen, the garment is placed on the lower platen and based on the reference features on the lower platen, and the image is projected onto the garment that is positioned on the lower platen. The image is projected to coincide with a location where the operator is to position the indicia or transfer, so that the operator has an exact or near exact reproduction of the indicia or transfer in the actual location where the indicia or transfer is to be placed.

It is desirable to project directly from above and orthogonal to lower platen, and to be able to align items such as graphics, pictures, or images with the lower platen, with such items stored locally in a controller or accessible via a cloud-based network. The disclosed controller 116/212 is able to transmit data to a projector, such as projection head 128/230/232 to project selected graphics, pictures, or images to the lower platen to assist with the garment printing process.

In this example the image is simply displayed on the garment and if the transfer matches 1:1 with the image on the garment, then no further action is necessary. And, if the size of the transfer does not match that of the image, then support arm assembly 122/226/228 may be moved up or down with respect to the lower platen until the image and transfer match in size. In another option, the size of the image itself may be adjusted to match that of the transfer and without moving support arm assembly 122/226/228 but instead by either manually adjusting the appropriate projection head 128/230/232 to enlarge or reduce the projected image, or via operation of the respective controller 116/212.

In another example, the projected image may be rotated by manually rotating projection head 128/230/232. It is contemplated that the image may be projected at an angle with respect to the lower platen and garment, in which case it may be distorted (i.e., as sunlight through a rectangular window does not form a rectangle on the floor, but is instead distorted and non-rectangular). In this case, image distortion may be corrected by manually adjusting location, angle, or tilt of projection head 128/230/232 to physically eliminate the distortion by automatically adjusting the orientation of the projected image on the lower platen.

Figure 3A:
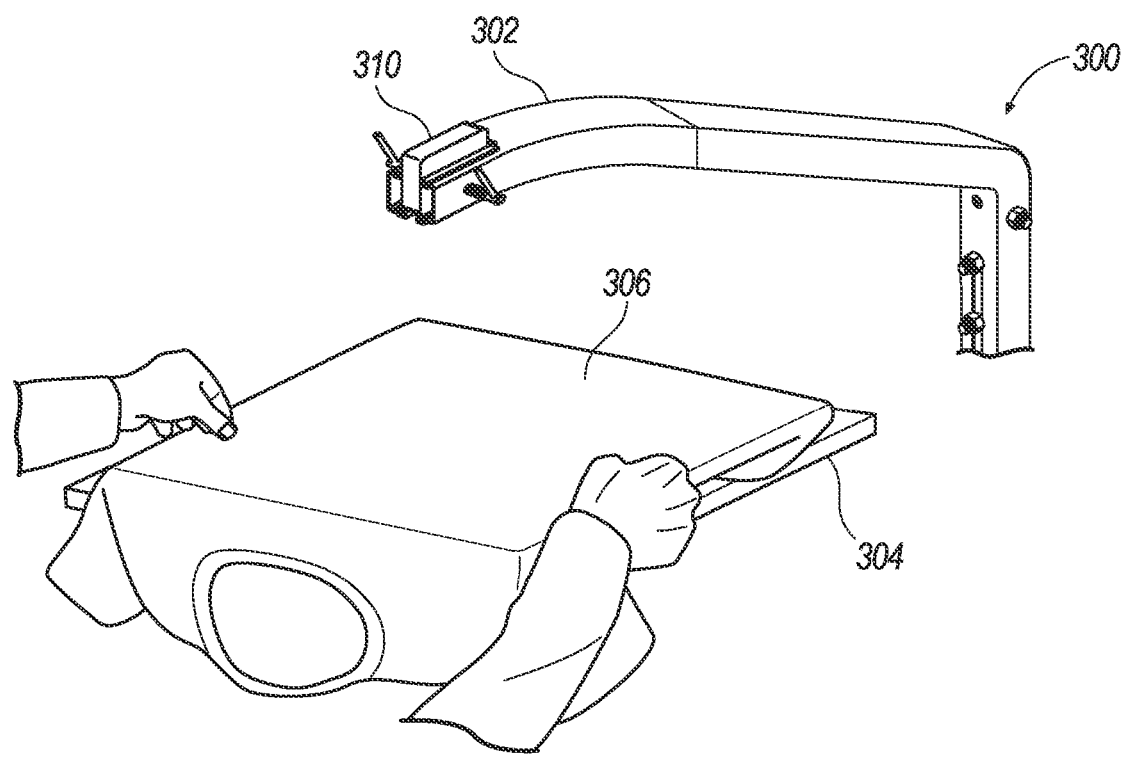
FIG. 3A is an illustration of a projector arm positioned above a lower platen of a press having a shirt positioned thereon.
Figure 3B:
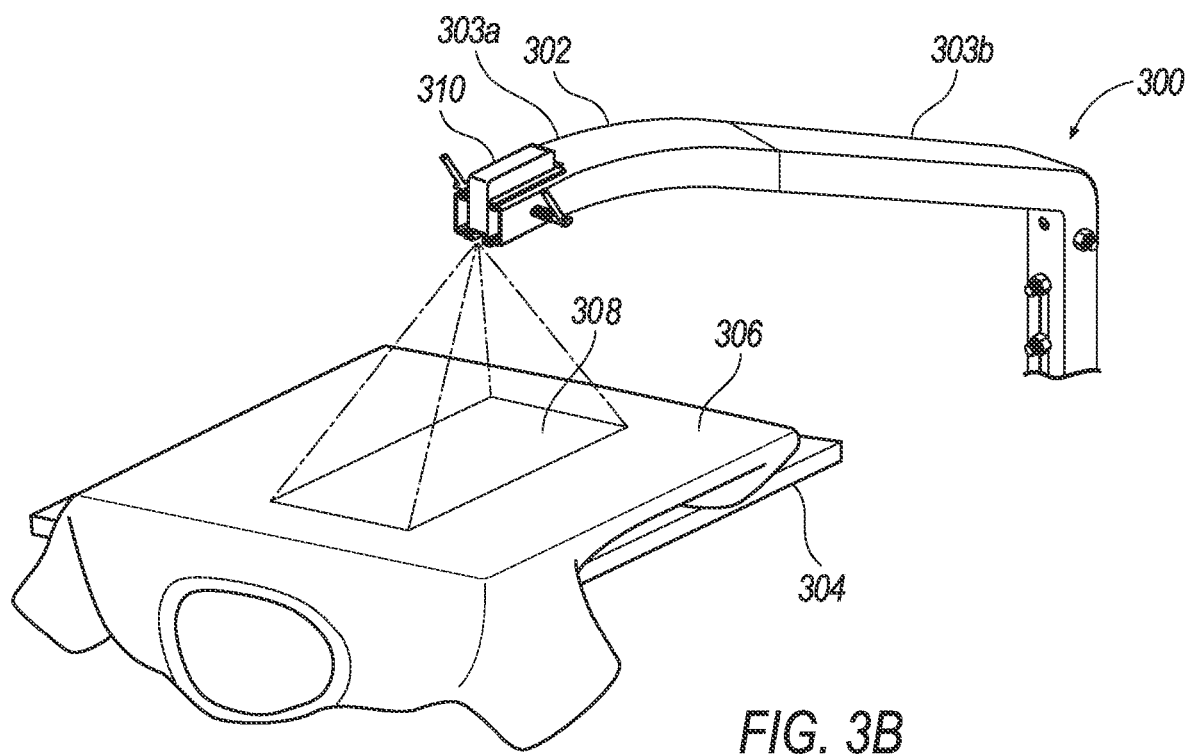
FIG. 3B is the illustration of FIG. 2A and having a positioning pattern projected to the shirt.
Figure 3C:
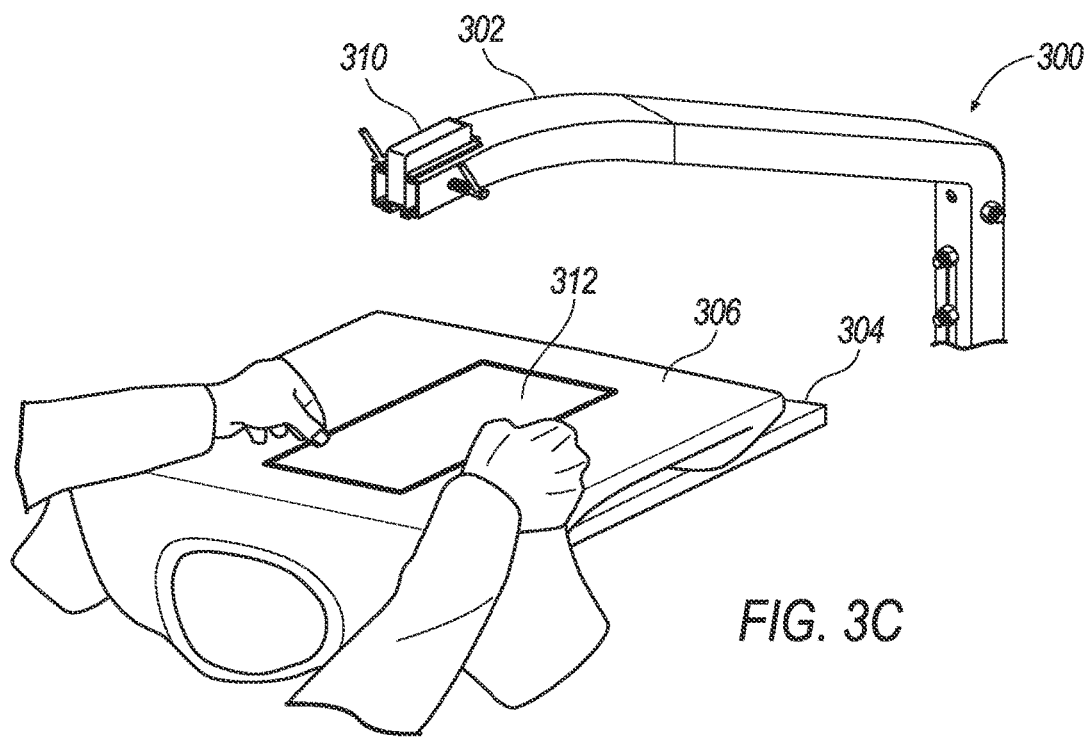
FIG. 3C is the illustration of FIG. 3A and having a transfer positioned on the shirt where the positioning pattern was of FIG. 3B.

Referring now to FIGS. 3A-3C, for simplicity of illustration and discussion, lower platen 102/202/204 and support arm assembly 122/226/228 are described above and as associated with transfer presses 100/200, and are illustrated and described herein disembodied from their respective transfer presses 100/200 for illustration and discussion purposes only, and are renumbered in FIGS. 3A-3C for simplicity, but correlate with the respective components as described above. FIG. 3A is an illustration of a support arm assembly 300 having an extension 302 extending above a lower platen 304 of a press having a garment or shirt 306 positioned thereon. FIG. 3B is the illustration of FIG. 3A and having an image 308 projected to shirt 306.

As discussed, if a projection head 310, coupled with extension 302, is not positioned at the desired elevation, then projection head 310 may be moved vertically up/down via support arm assembly 300, by adjusting the size of the image via manual adjustment of support arm assembly 300. If image 308 is not in its desired location forward to backward, then extension 302, comprised of a first extension 303*a* and second extension 303*b*, may be used to telescopically extend or shorten so that image 308 may be moved in and out without distorting the image. As indicated, image 308 may be rotated within a plane of lower platen 304 by manually rotating projection head 310. Further and as discussed, if image 308 is distorted (such as by projecting at an angle so that the projected image does not match that of the transfer), then manual corrections may be implemented. Still further, adjustments may be made in conjunction with one another according to the disclosure. Thus, FIG. 3C is the illustration of FIG. 3A and having a transfer 312 positioned on garment 306 at a location, size, and orientation of image 308 of FIG. 3B, and just prior to having its heat, pressure, and time applied to affix transfer 312 to garment 306.

Image 308 in FIGS. 3A-3C is illustrated, for simplicity purposes, as generally a rectangle and to match that of transfer 312. However, it is contemplated according to the disclosure that transfer, and thus corresponding image, could be any shape and size and need not be generally rectangular.

Figure 4:
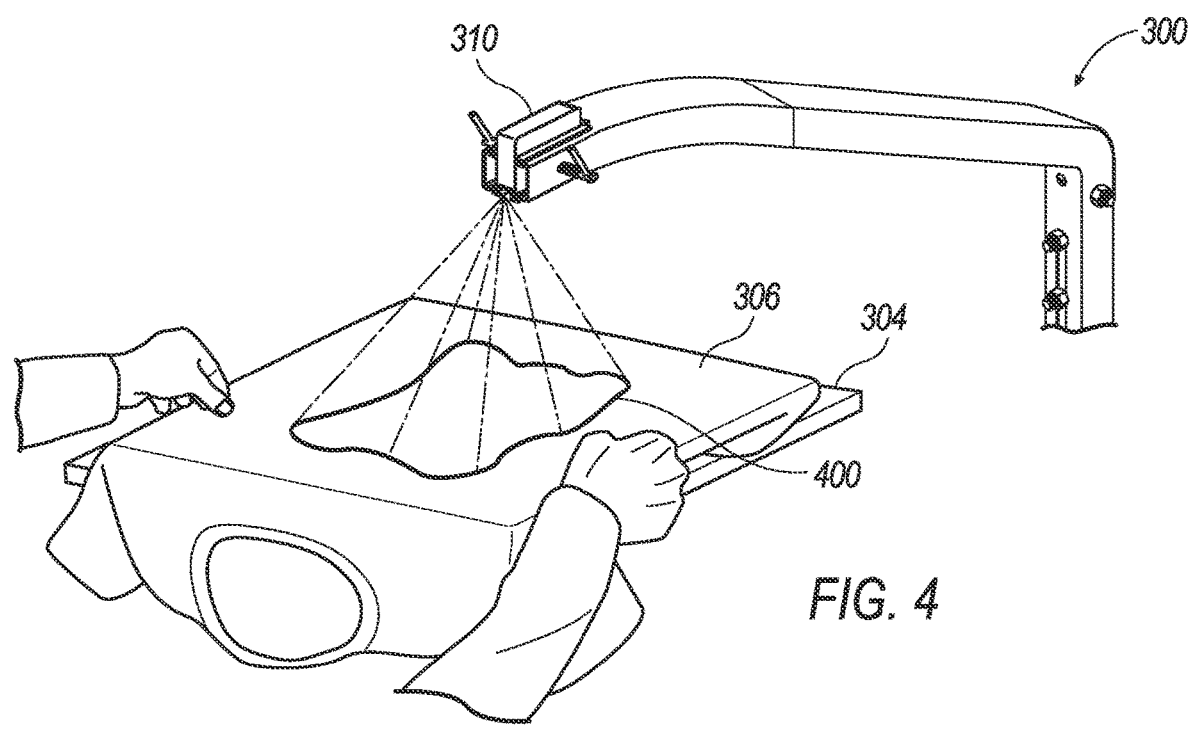
FIG. 4 is the illustration of FIG. 3A and having an irregular shaped positioning pattern projected to the shirt.

FIG. 4 illustrates an irregularly shaped image 400 that is selected to match with a transfer, such as transfer 312 of FIG. 3C.

Presses are typically operated in shops and manufacturing facilities globally, in which many thousands of operations are carried to apply transfers to apparel using pressure and heat for a given amount of time. However, there are widely varying conditions in which transfers are applied, not to mention a wide variety of types of transfers themselves. For instance, transfers may have different thicknesses, heat transfer characteristics, textures, and types of adhesives, to name a few. In addition, the apparel to which the transfer is attached can vary, as apparel can be cotton, polyester, or a mix of the two, as examples, and the apparel can also have different thickness from type to type, all of which can contribute to pressure, heat, and time settings that can vary from design to design.

And, conditions in which the presses are operated can vary widely, as well. For instance, some presses may be operated in hot tropical climates with little or no climate control for at least some conditions of operation—resulting in operation in a hot and humid environment. In other situations, presses may be operated in cold northern climates, in buildings that are heated—resulting in operation in a warm, low humidity environment. Operation in fact can take place in any sort of environmental condition, with the above being merely examples of conditions in which a press may be operated.

Thus, presses may be used under widely varying conditions, with different types of apparel, and with different types of transfers. Settings such as heat (or power to any heating elements), pressure, and time of application, as examples, can therefore vary widely depending at least on the above. As such, press settings are often determined via a trial-and-error approach, particularly if any "stock" or recommended settings from the manufacturer do not result in optimal adhesion of the transfer to the apparel.

That is, a manufacturer may include recommended settings for a given application, however due to the widely varying conditions described above, it may not be possible to account for all of such variations—leading a user to alter or have to "tweak" the stock or recommended press settings for specific applications. Users may therefore expend time, effort, and lost product in order to optimize press settings for any given application.

In addition, presses themselves may vary from location to location. For instance, some presses are automated or semi-automated, having press settings that are established for such type of operation. Other presses may be manually operated, and pressure applied may be established for manual operation in a manner that differs when compared to an automated press. Further, various releases of the same model press itself can result in a varied operation. That is, a press may be upgraded to a new model having, for instance, a different heating element or a different hydraulic pressure device, as examples. Or, a given model itself may be sold having upgraded control software with new settings, compared to a previous model.

Disclosed is an exemplary system that may include a network of presses that provide data usage for various types of presses, under various conditions of usage, and for varying types of applications. The disclosed system expedites a learning process to account for the above factors so that experience or best practices learned at one location, or for a given set of conditions, may be carried forth to another location or to another set of conditions, to account for the variances experienced. The disclosed system also provides feedback to a manufacturer so that new firmware may be written to improve process controls, or so that hardware may be upgraded based on usage in myriad different locations and conditions. The disclosed system also provides feedback so that setting upgrades may also be implemented, as well. Overall, the disclosed system and method heuristically employs best practices by accumulating statistical data and information related to pressure, time, and temperature, for a given apparel, indicia, or transfer, and applying that to other transfer presses, transfers themselves, and apparel to avoid what may otherwise be a long learning curve.

Also, and as discussed, myriad transfer types, sizes, thicknesses, textures, etc. . . . may be applied to garments and new transfers are added daily. As such and according to the disclosure, when a new transfer design is to be implemented in the system according to the disclosure, it is desirable to likewise include its corresponding image so that other systems may access the image that corresponds with the transfer, and as such a computer network is employed for this purpose, and according to the disclosure.

Figure 5:
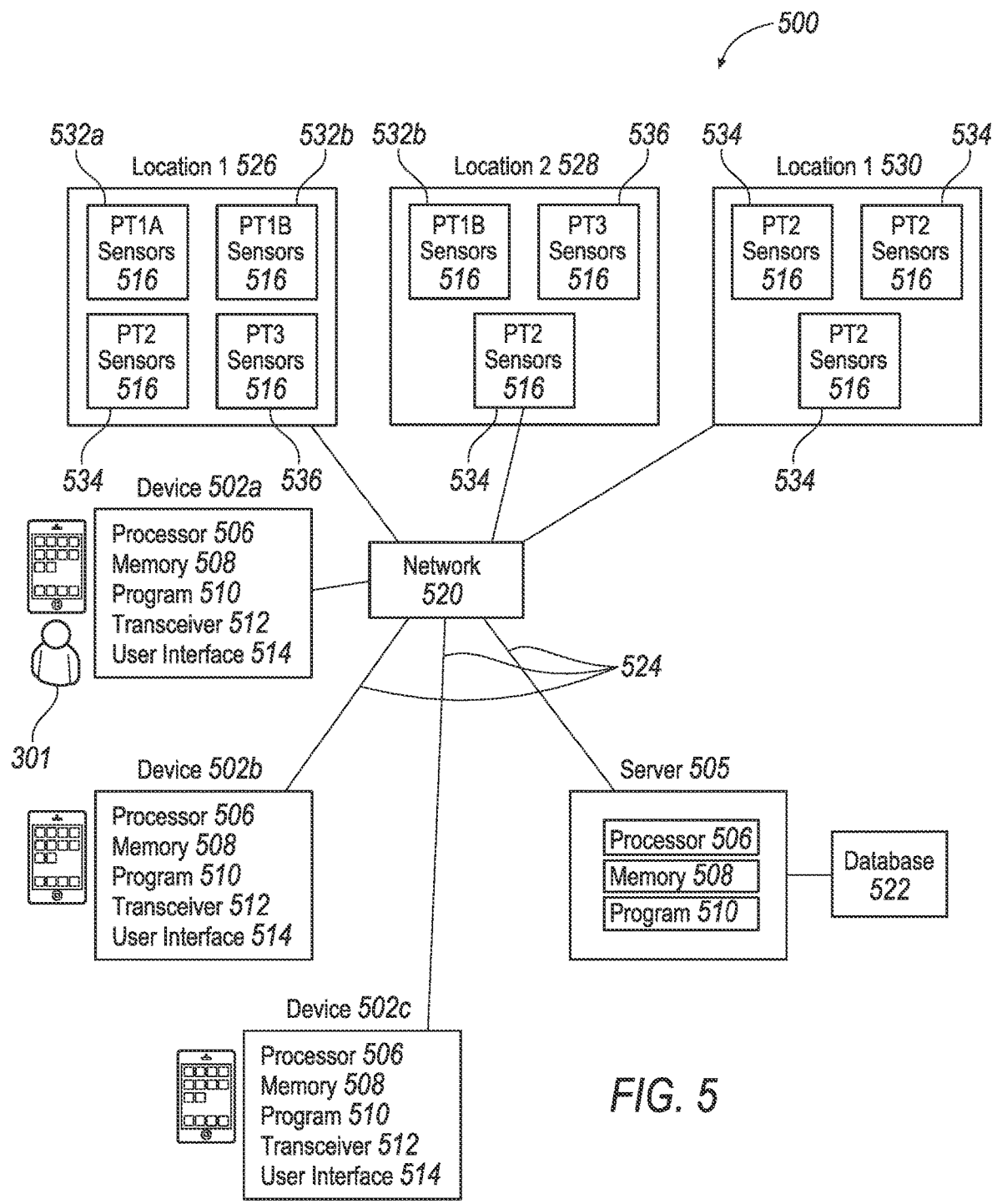
FIG. 5 illustrates an exemplary system including presses at more than one location and interconnected via a network.

FIG. 5 illustrates an exemplary system 500 that may be cloud-based and that may include transfer presses, to include the example of transfer press 100 of FIGS. 1A and 1B, as well as press 200 of FIG. 2, and may be used to obtain images that correspond with a given transfer (identified by a serial number or other identifying criteria to match a transfer to a corresponding image, to include size, orientation, and other criteria related to the transfer). System 500 may also be used by developers of transfers to upload image and corresponding information to a database to be accessible by users at different locations.

System 500 is able to generate and communicate press usage information based on usage at various locations, under different conditions, press types, and applications, using for instance a WIFI system. System 500 may take many different forms and include multiple and/or hardware components and facilities. While an exemplary system 500 is shown in FIG. 5, the exemplary components illustrated are not intended to be limiting, may be optional, and are not essential to any other component or portion of system 500. Indeed, additional or alternative components and/or implementations may be used.

System 500 may include or be configured to be utilized by a user 501 such as an engineer, statistician, or data processing technician. System 500 may include one or more of computing devices 502a, 502b, 502c, server 505, processor 506, memory 508, program 510, transceiver 512, user interface 514, sensors 516, network 520, database 522, and connections 524. Device 502 may include any or all of device 502a (e.g., a desktop, laptop, or tablet computer), device 502b (e.g., a mobile or cellular phone), and device 502c (e.g., a mobile or cellular phone). Processor 506 may include a hardware processor that executes program 510 to provide any or all of the operations described herein (e.g., by device 502, server 505, database 522, or any combination thereof) and that are stored as instructions on memory 508 (e.g., of device 502, server 505, or any combination thereof).

An exemplary system 500 may include user interface 514, processor 506, and memory 508 having program 510 communicatively connected to processor 506. System 500 may further include transceiver 512 that may be communicatively connected to one or a plurality of sensors 516 associated with each of a plurality of presses 504. For instance, system 500 may include a first location 526, a second location 528, and a third location 530 may, each of which may include one or more presses, press types, and/or press models. First location 526 may include a first press 532a, and a second press 532*b*. Both presses 532*a*, 532*b* may each be the same type of press (e.g., the same design), but representing different model releases (e.g., press 532*b* may be a subsequently released model having an improved heating element, as one example). First location 526 may also include a second press type 534 and a third press type 536.

Second location 528, representative of a different manufacturing facility than that of first location 526, may be either a different building within the same plot of land, a different state or country, or may be a different fabricator that uses the same or similar presses as used by a manufacturer at second location 528. Third location 530, similarly, may be representative of yet a different manufacturing facility, may be either a different building within the same plot of land, a different state or country, or may also be a different fabricator that uses the same or similar presses as used by other manufacturers.

System 500 using processor 506 may provide operations that include displaying by way of user interface 514 statistics related to usage of each of presses 532, 534, 536. That is, each of presses 532, 534, 536 may have input thereto, as will be further described, via sensors 516. Sensors 516 may generally be pressure sensors, temperature sensors, timing circuits, and the like, which may provide information about a given event (such as a shirt fabrication process in which a transfer may be applied to a piece of apparel). System 500 may also provide software, firmware, and sensor or other setting updates to any of presses 532, 534, 536 at any of first, second, and third locations 526, 528, 530 via network 520 and transceiver 512. That is, user 501 may update press settings having operational instructions for a press, firmware, sensor settings, time, temperature, pressure, and the like, in device 502*a*, device 502*b*, and/or device 502*c*.

System 500 may include an overall network infrastructure through which any of devices 502, server 505, and database 522 may communicate, for example, to transfer information between any portion of system 500 using connections 524. In general, a network (e.g., system 500 or network 520) may be a collection of computing devices and other hardware to provide connections and carry communications. Devices 502 may include any computing device such as a mobile device, cellular phone, smartphone, smartwatch, activity tracker, tablet computer, next generation portable device, handheld computer, notebook, laptop, projector device, or virtual reality or augmented reality device. Devices 502 may include processor 506 that executes program 510. Device 502 may include memory 508 that stores press model, setting, and other information, and program 510. Device 502 may include transceiver 512 that communicates information between any of devices 502, sensors 516, server 505, and database 522.

Server 505 may include any computing system. Server 505 may generate by processor 506, program 510 and store information by memory 508, e.g., information particular to each of presses 532, 534, 536. Server 505 may communicatively connect with and transfer information with respect to devices 502, sensors 516, and database 522. Server 505 may be in continuous or periodic communication with devices 502, sensors 516, and database 522. Server 505 may include a local, remote, or cloud-based server or a combination thereof and may be in communication with and provide information (e.g., as part of memory 508 or database 522) to any or a combination of devices 502. Server 505 may further provide a web-based user interface (e.g., an internet portal) to be displayed by user interface 514. Server 505 may communicate the information with devices 502 using a notification including, for example automated phone call, short message service (SMS) or text message, e-mail, http link, web-based portal, or any other type of electronic communication. In addition, server 505 may be configured to store information as part of memory 508 or database 522. Server 505 may include a single or a plurality of centrally or geographically distributed servers 505. Server 505 may be configured to store and coordinate information with and between any of devices 502, and database 522. System 500, or any portion of system 500 such as devices presses 532, 534, 536, may include one or more sensors 516 configured to receive sensor inputs and provide sensor outputs, e.g., including press usage information associated with temperatures and pressures.

User interface 514 of devices 502 may include any user interface device, display device, or other hardware mechanism that connects to a display or supports user interfaces so as to communicate and present press information throughout the system 500. User interface 514 may include any input or output device to facilitate receipt or presentation of information (press operation information) in audio or visual form, or a combination thereof. Examples of a display may include, without limitation, a touchscreen, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, projector device, and the like. User interface 514 may present information to any user of devices 502.

Connections 524 may be any wired or wireless connections between two or more endpoints (e.g., devices or systems), for example, to facilitate transfer of press information, to facilitate upgradeable enhancements to presses, such as wirelessly or via wired connections. Connection 524 may include a local area network, for example, to communicatively connect the devices 502 with network 520. Connection 524 may include a wide area network connection, for example, to communicatively connect server 505 with network 520. Connection 524 may include a wireless connection, e.g., radiofrequency (RF), near field communication (NFC), Bluetooth communication, WIFI, or a wired connection, for example, to communicatively connect the devices 502, and sensors 516.

Presses 532 may thereby be operated to include pressure, temperature, power, and time settings, as examples, for a given application. According to the disclosure, data is heuristically obtained for, for instance, a given apparel and transfer design. Best practices are employed based on experience obtained in some locations or with one transfer press, as examples, and applied to other transfer presses, apparel designs, transfers, and at other locations. Statistical data is accumulated in, for instance, database 522, and best practices from the heuristic data are accumulated, analyzed, and optimized in order that settings may be collectively improved based on what is learned from other applications, locations, etc. For instance, a first location may operate several presses, and even several models of presses. Data may thereby be accumulated in database 522, analyzed, and optimized such that settings may be refined or revised for use at, for instance, a second location. Parameters particular to a specific type of apparel—such as fabric thickness, fabric type (e.g., cotton), or specific to the transfer.

Any portion of system 500, e.g., devices 502 and server 505, may include a computing system and/or device that includes a processor 506 and a memory 508. Computing systems and/or devices generally include computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, etc. System 500, e.g., devices 502 and server 505 may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 502 and server 505) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing systems and/or devices such as devices 502, and server 505 may include, without limitation, mobile devices, cellular phones, smart-phones, super-phones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Further, processors such as processor 506 receive instructions from memories such as memory 508 or database 522 and execute the instructions to provide the operations herein, thereby performing one or more processes, including one or more of the processes described herein. Such instructions and other guidance information may be stored and transmitted using a variety of computer-readable mediums (e.g., memory 508 or database 522). Processors such as processor 506 may include any computer hardware or combination of computer hardware that is configured to accomplish the purpose of the devices, systems, operations, and processes described herein. For example, processor 506 may be any one of, but not limited to single, dual, triple, or quad core processors (on one single chip), graphics processing units, and visual processing hardware.

A memory such as memory 508 or database 522 may include, in general, any computer-readable medium (also referred to as a processor-readable medium) that may include any non-transitory (e.g., tangible) medium that participates in providing guidance information or instructions that may be read by a computer (e.g., by the processors 506 of the devices 502 and server 505). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other guidance information stores (e.g., memory 508 and database 522) described herein may generally include various kinds of mechanisms for storing, providing, accessing, and retrieving various kinds of guidance information, including a hierarchical database, a set of files in a file system, an application database in a proprietary format, a relational database management system (RDBMS), etc. Each such guidance information store may generally be included within (e.g., memory 508) or external (e.g., database 522) to a computing system and/or device (e.g., devices 502 and server 505) employing a computer operating system such as one of those mentioned above, and/or accessed via a network (e.g., system 500 or network 520) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. Memory 508 and database 522 may be connected to or part of any portion of system 500.

Referring to FIG. 6 and according to the disclosure, a method 600 starts at 602 and at step 604 a transfer is selected. At step 606 an image is obtained, which may be via an image provided with transfer or may be obtained via a computer network, such as network 500. At step 606, the image may be transferred to the projector though wireless connection or a wired connection. At step 608 a garment is positioned on a lower platen of any of the presses and lower platens described herein, and at step 610 the obtained image of the transfer is projected to the garment, to include any corrections to the image, to include size, angular orientation, location, distortion, or any corrections described herein. At step 612 the transfer is positioned on the garment to match the position of the image, and at step 614 the heat press is applied, to include time, temperature, pressure, and applying any other relevant parameters to affix the transfer to the garment. Method 600 ends at 616.

Figure 7:
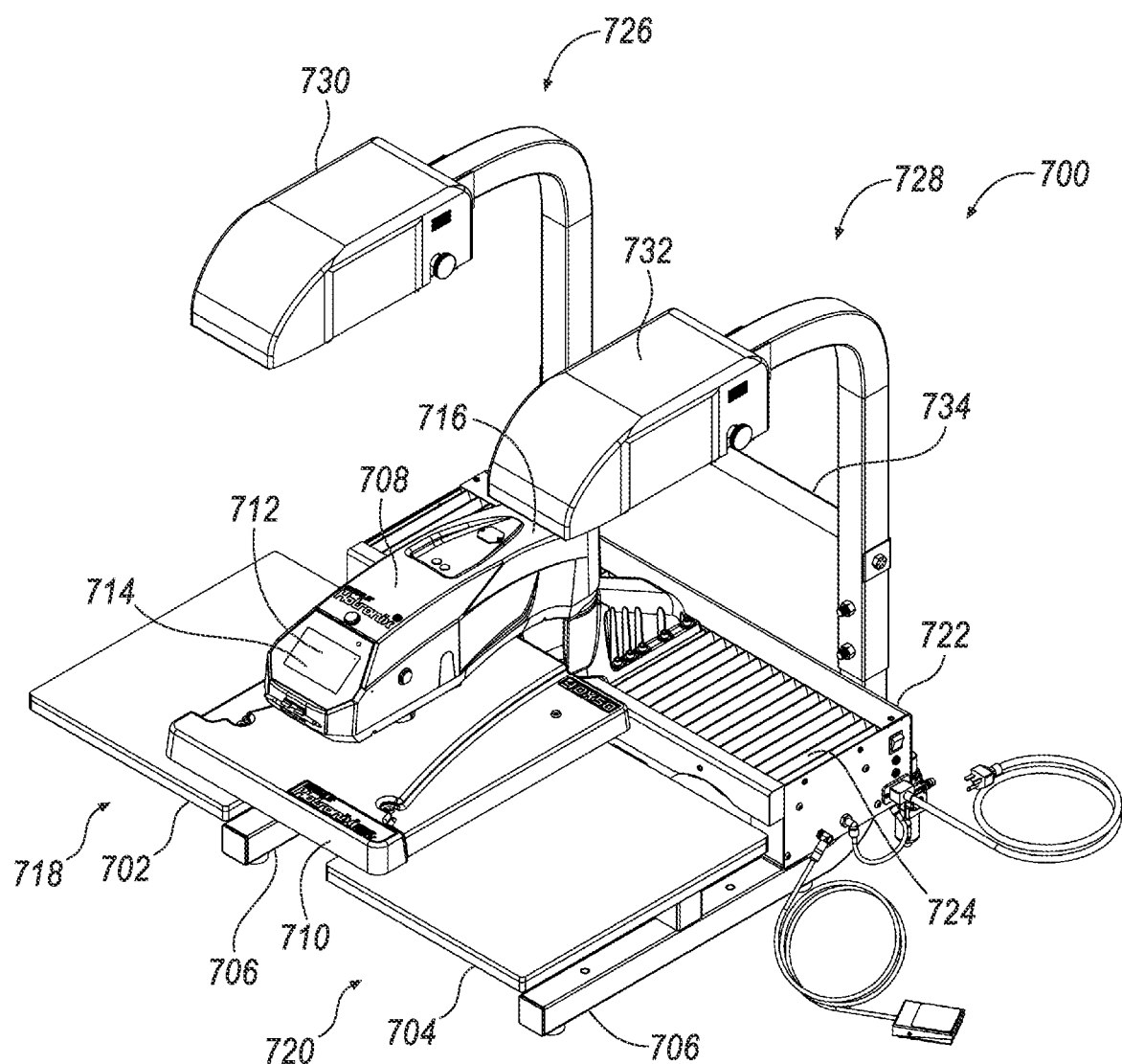
FIG. 7 is a perspective view of a dual press having projector arms over each press.

FIG. 7 is a perspective view of a dual press 700 or two-platen design having projector arms over each press, according to the disclosure. Press 700 otherwise operates having upper and lower platens, a controller, heating elements, etc. . . . as described in the above single platen designs (as described in FIGS. 1A and 1B), and the above description for FIGS. 1A and 1B is incorporated into the following description—noting distinctions between stand 104 and the support base for press 200. Press 700 operates also in a similar fashion to Press 200 of FIG. 2, noting that press 700 includes projectors positioned toward a back end of press 700, and having reflective mirrors positioned toward the front of press 700. The projectors project an image to the mirror, which is angled in such a fashion that the image then reflects downward and toward the lower platen.

Thus, press 700 operates in having automated control of temperature, pressure, and time of operation as described above with respect particularly to other disclosed press examples. The upper platen and support head are movable left to right, so that a garment and transfer can be placed onto one lower platen while a transfer is being affixed to a garment via the heat press on the other lower platen, with the process repeating back and forth.

Press 700 includes a first lower platen 702 and a second lower platen 704 mounted on a stand 706 or base frame, and a support head 708 supporting an upper platen 710 above lower platens 702, 704. Lower platens 702, 704 operate in similar fashion as described above and with respect to lower platens 102, 202, and 204. Force may be applied to upper platen 710 through a pair of shafts, and the mechanism for displacing the upper platen to impart a force to lower platens 702, 704 may include a pneumatic pressure chamber, as similarly described and illustrated in FIGS. 1A and 1B.

Operation of press 700 is carried out in a fashion similar to that of press 100 described above. However, in addition, support head 708 may be moved and positioned over each of lower platens 702, 704 using a controller 712 and a visual display 714 which interfaces with controller 712. Upper platen 710 is supported by a linearly moveable support structure 716, moveable from a first position 718 over lower platen 702, to a second position 720 over lower platen 704. Moveable support structure 716 is positioned within a containment structure 722 having a bellows-like flexible protective device 724, to either side of moveable support structure 716, which flexes and retracts in an accordion-like fashion as moveable support structure 716 is moved to left and right. Contained within containment structure 722 is an electric motor or pneumatic actuator (not visible) controlled by controller 712, operable to move support structure 716 between first position 718 and second position 720. Each of first and second positions 718, 720 includes its own corresponding support arm assembly 726, 728. Each support arm assembly 726, 728 includes a respective projection assembly 730, 732.

Figure 8:
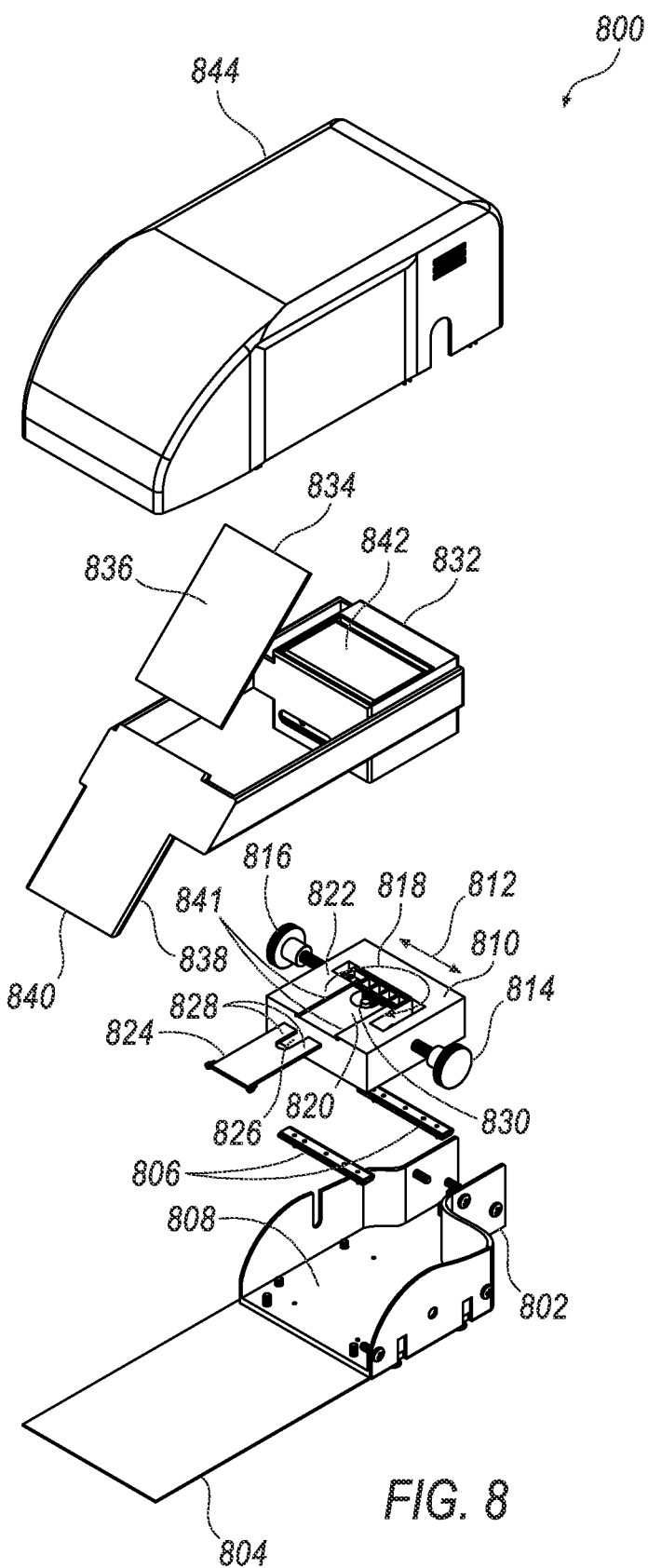
FIG. 8 is an exploded top perspective view of a projection assembly.

Referring now to FIG. 8, an exploded top perspective view of a projection assembly 800 is shown, which correlates with each of projection assemblies 730, 732. Projection assembly 800 includes a base bracket 802 to support assembly 800, and is proximate a transparent panel 804. Sliding rails 806 are attached to a bottom surface 808 of base bracket 802. An adjustment block 810 is attached to sliding rails 806 such that adjustment block 810 may be adjusted laterally 812 and with respect to bottom surface 808 of base bracket 802 via rotation of a linear slide knob 814, and as will be further discussed. A rotational adjustment knob 816 is attached to adjustment block 810 such that adjustment block 810 may be adjusted rotationally 818 with respect to bottom surface 808, and as will be further discussed.

Adjustment block 810 includes a recess or slot 820 along an upper surface 822, into which a holding bracket 824 may be positioned by sliding into slot 820. Holding bracket 824 includes a slot 826 formed by two lateral extensions 828, slot 826 provided to avoid obstruction of a rotational gear 830 that although visible, is attached to a projection frame 832. Projection frame 832 includes a mirror support 836 that supports a mirror 834, with mirror 834 contained by side lips 838 and a stop 840 that capture mirror 834 and maintain its position against mirror support 836. Mirror 834 is free floating and positioned against mirror support 836. Side lips 838 and stop 840 thereby capture mirror 834 in place and prevent further motion thereof once slid into position. In one example, mirror 834 may be installed via the used of side lips 838 and stop 840, and then adhered to mirror support using an adhesive such as epoxy. Holding bracket 824 holds projection frame 832 to adjustment block 810. Slot 820 includes, in one example, slide lips 841 such that lateral extensions 828 first slide thereinto, and then fully thereinto, such that projection frame 832 is held together with adjustment block 810. A projector 842 is attached to projection frame 832, and, when assembled, an enclosure or cover 844 encloses projection assembly 800 and is attached to base bracket 802.

Figure 9:
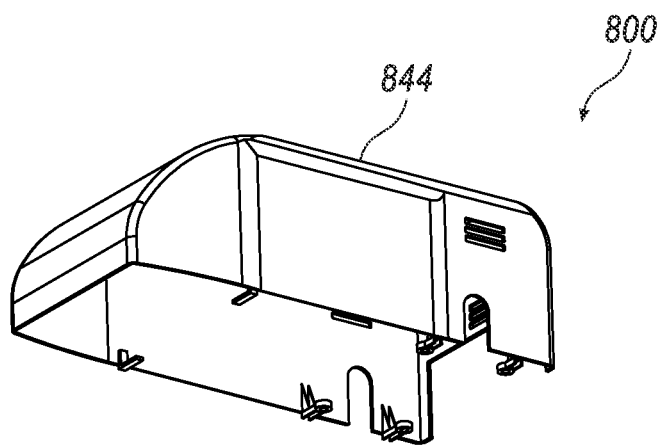
FIG. 9 is an exploded bottom perspective view of the projection assembly.
Figure 9:
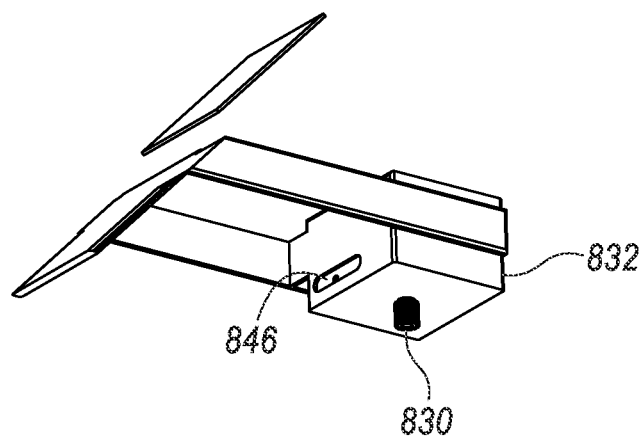
Figure 9:
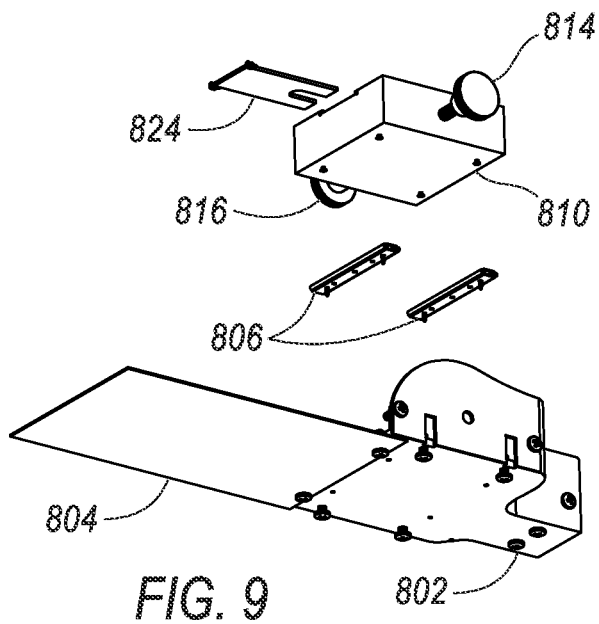

Referring now to FIG. 9, an exploded bottom perspective view of projection assembly 800 is shown. In this view, base bracket 802, transparent panel 804, sliding rails 806, adjustment block 810, holding bracket 824, projection frame 832, and enclosure or cover 844 are visible from below. Projection frame 832 includes an opening 846 and rotational gear 830 that are visible in this view from below. Opening 846 is positioned such that an image may be projected therethrough from projector 842, and to mirror 834. Rotational gear 830 couples with a gear rack (904 in the illustration of FIG. 10) such that adjustment block 810 is rotationally adjustable with respect to base bracket 802 via the use of rotational adjustment knob 816.

Figure 10:
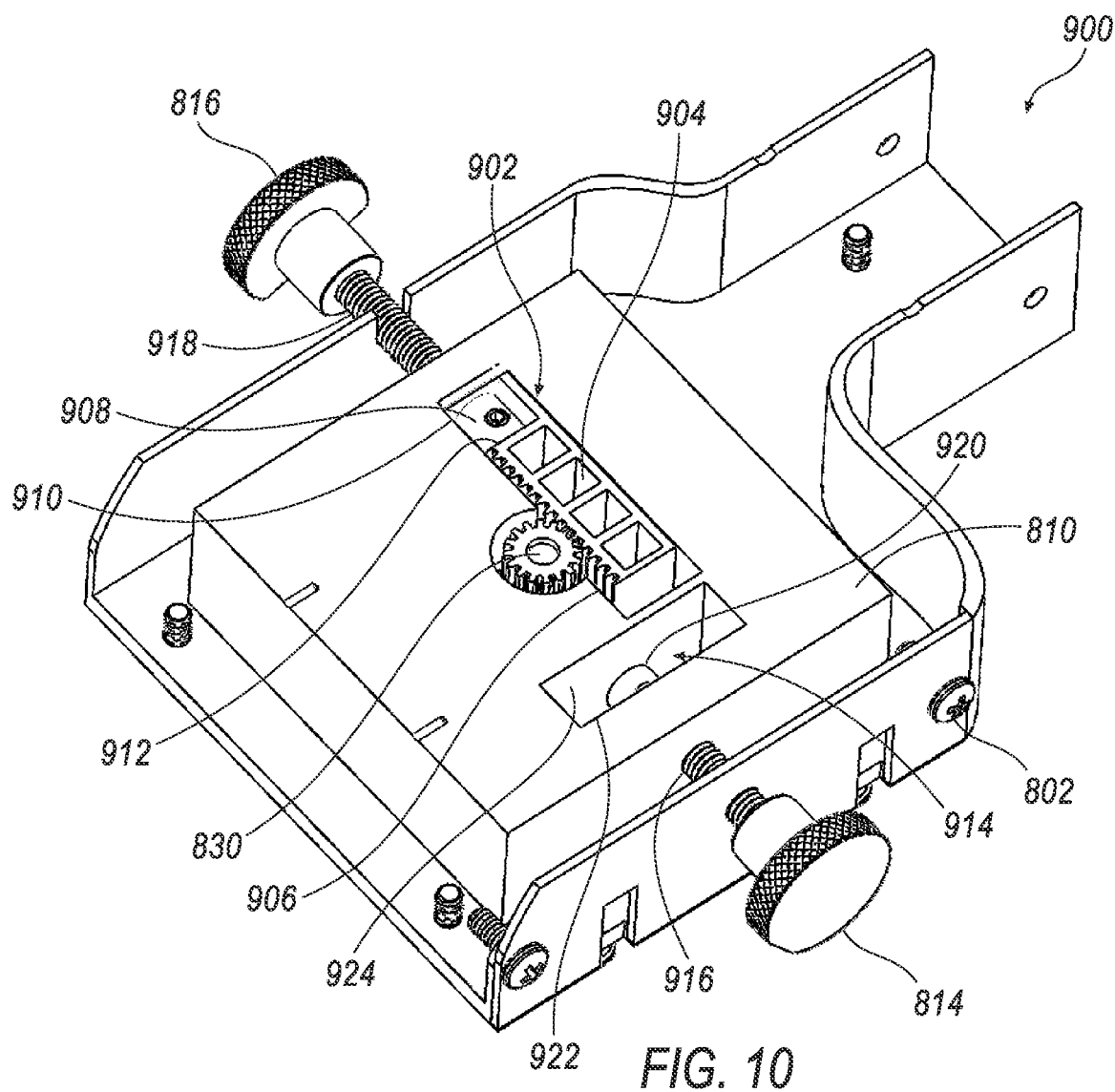
FIG. 10 illustrates an upper perspective view of a slice or cutaway of the adjustment block positioned within the base bracket.

FIG. 10 illustrates an upper perspective view of a slice or cutaway 900 of adjustment block 810 positioned within base bracket 802. Slice 900 is taken from below slot 820, its slice location illustrated in FIG. 11, so slot 820 is not visible as in FIGS. 8 and 9, and internal workings of the various components are thereby visible, and the view is made also with the slice or cutaway passing through base bracket 802. Slice 900 illustrates a rotational adjustment mechanism that includes an opening 902 within adjustment block 810, and a gear rack 904 positioned within opening 902. Gear rack 904 includes linear gear teeth 906 that engage with rotational gear 830 which, as described with respect to FIG. 9. Rotational adjustment knob 816 is threaded via a threaded portion 918 through adjustment block 810 so that a rotation of rotational adjustment knob 816 results in a rotational plunger 908 moving laterally back and forth within opening 902. Rotational plunger 908 is constrained by a first wall 910 and a second wall 912, such that rotation of rotational adjustment knob 816 causes gear rack 904 to also move linearly, causing rotation of rotational gear 830 due to linear motion of gear rack 904 via engagement with linear gear teeth 906. Thus, rotation of rotational adjustment knob 816 thereby causes rotational action of rotational gear 830, such that projection frame 832 is thereby caused to rotate as indicated in FIG. 8 at 818.

Adjustment block 810 includes a second opening 914, and a linear adjustment mechanism that includes linear slide knob 814 and includes a threaded portion 916 through adjustment block 810 so that a rotation of linear slide knob 814 results in a linear plunger 920 moving laterally in second opening 914. Linear plunger 920 is constrained by a first wall 922 and a second wall 924, such that rotation of linear slide knob 814 engages with adjustment block 810 in both directions, causing linear or back and forth motion of adjustment block 810. Thus, rotation of linear slide knob 814 thereby causes back and forth motion of adjustment block, such that projection frame 832 is thereby caused to move back and forth as indicated in FIG. 8 at 812.

Regarding both rotational 818 and linear 812 adjustment mechanisms disclosed herein, it is noted that adjustment block 810 moves only back and forth and linearly via linear slide knob 814, and such motion does not impact a rotational position of rotational gear 830 (or projector 842) since adjustment block 810 slides back and forth with respect to gear rack 904. Thus, linear adjustment of adjustment block 810 does not impact the rotational position of rotational gear 830. Likewise, rotational operation of rotational gear 830 does not impact an axial location of adjustment block 810, because engagement of gear rack 904 causes motion of gear rack 904 with respect to adjustment block. As such, operation of one knob to cause one motion is independent of the other operation, and both linear motion 812 of rotational motion 818 of projection frame 832 are independent of one another.

Further, due to the captured nature of each plunger 908, 920, it is understood that the independent linear and rotational operation occurs with little or no backlash in the two directions 812, 818. That is, rotational plunger 908 is positioned generally against, or in very close proximity, to each of walls 910, 912, so that operation in both rotational directions (i.e., clockwise and counter-clockwise) of rotational adjustment knob 816 causes back and forth operation of gear rack 904 without backlash and enabling micro-adjustment in both linear and rotational directions, the adjustment precision determined by known features of gear operation, such as the size of the meshing gears, diameter of the circular gear, etc. . . . . . Thus, rotational plunger 908 is a length that matches a spacing between walls 910, 912.

Further, and referring back to FIG. 10, it is contemplated that linear motion toward and away from the mirror also may be included, and in a direction (not illustrated) that is orthogonal to direction 812. In this fashion, a location of adjustment block 810 may also be micro-adjusted in its distance or spacing to mirror 834.

Similarly, linear plunger 920 is generally against, or in very close proximity, to each of walls 922, 924, so that operation in both rotational directions (i.e., clockwise and counter-clockwise) of linear slide knob 814 causes back and forth operation of adjustment block 810 without backlash. Thus, linear plunger 920 is a length that matches a spacing between walls 922, 924.

Thus, according to the disclosure block 810 operates without binding in operation of linear slide knob 814 and rotational adjustment knob 816. Circular gear 830 floats in its opening on FIG. 10 and is attached to the underside of projection frame 832, see FIG. 9. The underside of projection frame 832 rests on top of adjustment block 810 so that projection frame 832 rotates with respect to adjustment block 810 when adjustment knob 816 is rotated, causing gear rack 904 to move in and out, which rotates gear 830 and therefore projection block 832. On the other hand, rotation of the other knob 814 causes the adjustment block 810 to move linearly back and forth. Further, holding bracket 824 slides in recess 820 and is flush with the surface of adjustment block 810, which also covers the gear from projection frame 832. It will form a flush plane and prevent projection frame 832 from disengaging.

Figure 11:
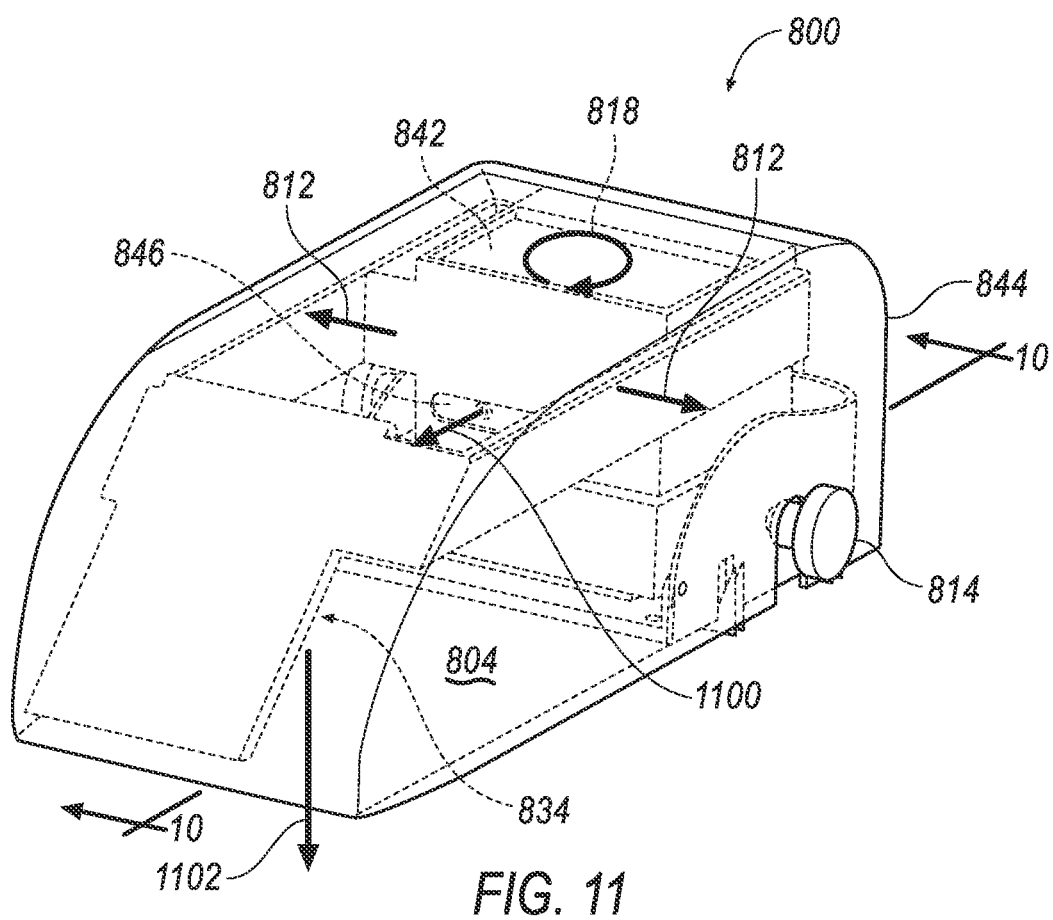
FIG. 11 is a semi-transparent view of the projection assembly, illustrating linear and rotational motion.

FIG. 11 is a semi-transparent view of projection assembly 800, illustrating the independent operation to enable movement of projection assembly 800 both linearly 812 and rotationally 818. In this view, opening 846 is shown having a projection or projected image 1100 passing therethrough, which emanates or is projected from projector 842. Projection 1100 is directed toward mirror 834, and reflected therefrom such that projected image 1100 is thereby reflected downward 1102 and through transparent panel 804. Transparent panel 804 is attached to enclosure or cover 844 to prevent dust from entering the enclosure and prevent damage from occurring to components contained therein, while allowing passage of reflected image 1102 to pass to the lower platen.

Figure 12:
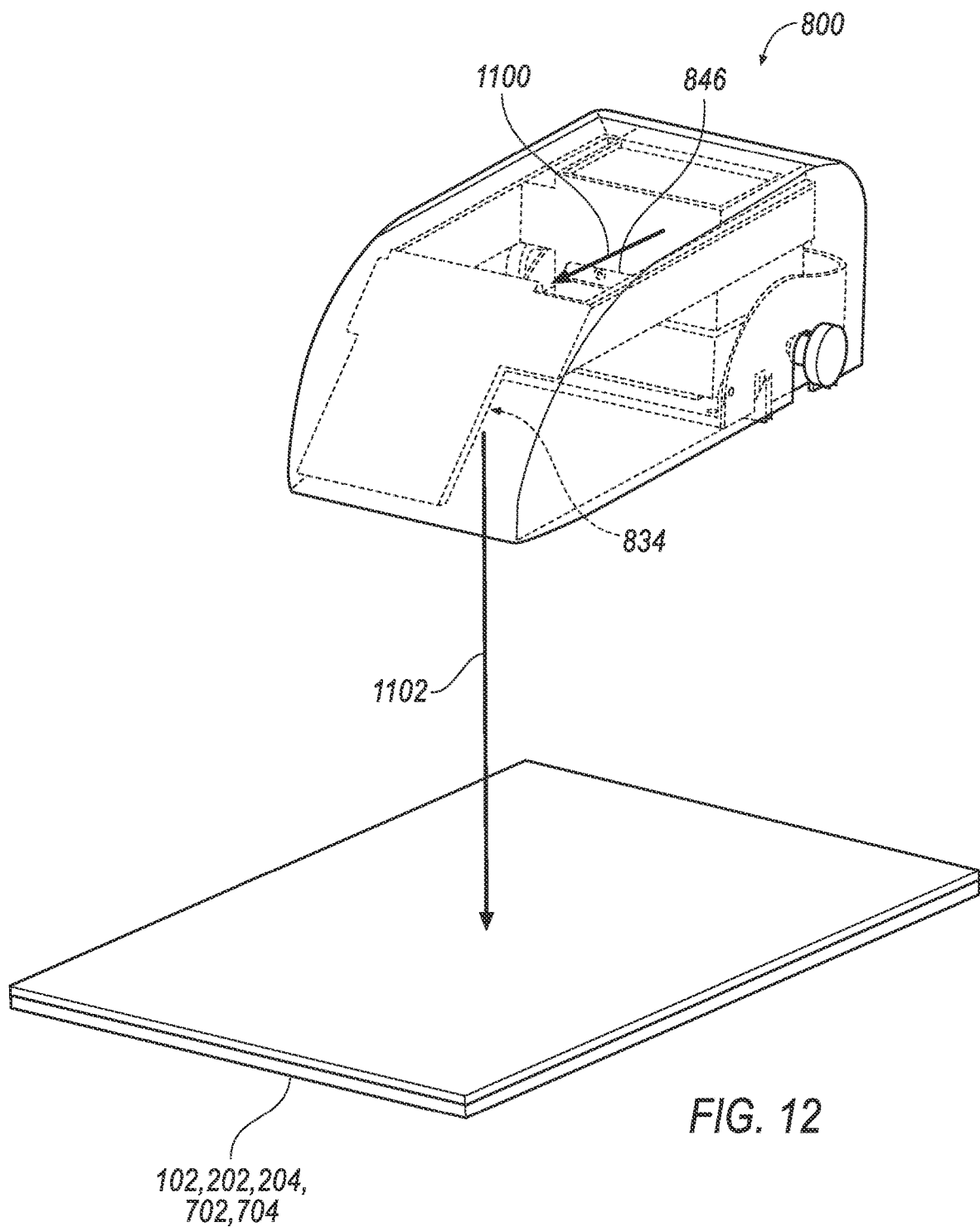
FIG. 12 illustrates the projection assembly positioned with respect to a lower platen.

FIG. 12 illustrates projection assembly 800 and positioned with respect to the lower platen, such as any of lower platens 102, 202, 204, 702, or 704 as described herein. Projection 1100 is directed toward mirror 834, and reflected therefrom such that projected image 1100 is thereby reflected downward 1102 and through transparent panel 804, and to the platen.

Referring now back to FIG. 7, support arm assembly 726 includes projection assembly 730 and support arm assembly 728 includes a projection assembly 732, both of which include features and operation as described above and with respect to FIGS. 8-12. In one example, an optional support beam 734 is positioned between support arm assemblies 726, 728 to provide additional structural support. Each projection assembly 730, 732 is attached to a respective support arm assembly and positioned to project an image from the projection head to the respective lower platen, the image selected to match in size with a transfer to be applied to the garment, to guide a user where to place the first transfer onto the garment.

Thus, in operation, controller 712 causes moveable support structure 716 to move left to right, and vice versa, between first position 718 and second position 720. When at one of the positions 718 and 720, controller 712 causes an automated press operation to apply a set amount of heat to be applied, with a given pressure, and for a set duration of time. Meanwhile, at the other of the positions 718 and 720, a user removes a shirt that has just been pressed having a transfer attached, and the user places a new shirt and positions a transfer on top of the shirt, using corresponding projection assemblies 730, 732 accordingly.

Each of the disclosed presses includes a controller, operable as described below. As in FIGS. 1A and 1B, transfer press 100 includes controller 116, in FIG. 2 transfer press 200 includes controller 212, and in FIG. 7 transfer press 700 includes a controller 712. Controller 712 includes further features to control the left to right motion and the operation of both projection assemblies 730, 732 and all additional features incumbent upon operating a dual press as opposed to a single press, including automatically switching projection from one projection head to the other during the shifting operation between left and right.

An operator may have an indicia or transfer to be applied to a garment and, according to the disclosure may obtain an image of the transfer via a database that is part of controller 712, or may be from a remote database and via a computer network that is external to controller 712 and remote to transfer press 700. In one example, an image corresponding with the transfer to be adhered to a garment may be provided separately, such with the garment itself, and such as on a thumb drive, jump drive, data stick, USB (Universal Serial Buss) key, and the like. In this example, the image and other instructions may provide reference features that project to the lower platen to guide placement of the garment, and then concurrently a location for the transfer itself on the garment (and with respect to the reference features) are also included. Once the image and reference features are obtained, according to the disclosure the references features are projected to the lower platen, the garment is placed on the lower platen and based on the reference features on the lower platen, and the image is projected onto the garment that is positioned on the lower platen. The image is projected to coincide with a location where the operator is to position the indicia or transfer, so that the operator has an exact or near exact reproduction of the indicia or transfer in the actual location where the indicia or transfer is to be placed.

It is desirable to project directly from above and orthogonal to lower platen, and to be able to align items such as graphics, pictures, or images with the lower platen, with such items stored locally in a controller or accessible via a cloud-based network. The disclosed controller 712 is able to transmit data to a projector, such as projection assemblies 730, 732 to project selected graphics, pictures, or images to the lower platen to assist with the garment printing process.

In this example the image is simply displayed on the garment and if the transfer matches 1:1 with the image on the garment, then no further action is necessary. And, if the size of the transfer does not match that of the image, then support arm assembly 726/728 may be moved up or down with respect to the lower platen until the image and transfer match in size. In another option, the size of the image itself may be adjusted to match that of the transfer and without moving support arm assembly 726/728 but instead by either manually adjusting the appropriate projection assemblies 730/732 to enlarge or shrink the projected image, or via operation of the controller 712.

In another example, the projected image may be rotated by manually rotating projection assemblies 730/732. It is contemplated that the image may be projected at an angle with respect to the lower platen and garment, in which case it may be distorted (i.e., as sunlight through a rectangular window does not form a rectangle on the floor, but is instead distorted and non-rectangular). In this case, image distortion may be corrected by manually adjusting location, angle, or tilt of projection assemblies 730/732 to physically eliminate the distortion by automatically adjusting the orientation of the projected image on the lower platen.

Thus, according to the disclosure, in lieu of extensions 106 and 302 described above, support arm assemblies 726/728 are positioned proximate where extensions 106 and 302 are positioned in the above figures, but in this example support arm assemblies 726/728 include projection assemblies 730/732 and mirror 836 positioned therein. Projector 842 is positioned toward one end and mirror 834 is toward the other end of projection assemblies 730/732. Mirror 834 is positioned above the lower platen, corresponding to the lower platens as described above.

Projector 842 projects a projection 1100 toward mirror 834, which is angled (in one example, at 45°) such that a reflected projection 1102 projects as an image onto the lower platen. The image projected onto the lower platen corresponds with projected images described above, such as in FIGS. 3B, 4, and 7. In one example, mirror 834 is fixed and not adjustable so that end users may not alter positions of where the image is to be projected. However, in one example projector 842 may be moved or adjusted to alter a position of the image, and in another example mirror 834 may be positioned in a fixed location. It is generally preferred not to include an ability for an end user to adjust locations or directions of the projector or mirror, other than micro-adjustments to correct for small errors, so that proper operation and location of 1) garment on lower platen and 2) image on garment—are always correctly obtained where desired. However, in some instances it may be desirable to include such ability of an end user such as to correct micro-errors in image location on the lower platen.

Figure 13:
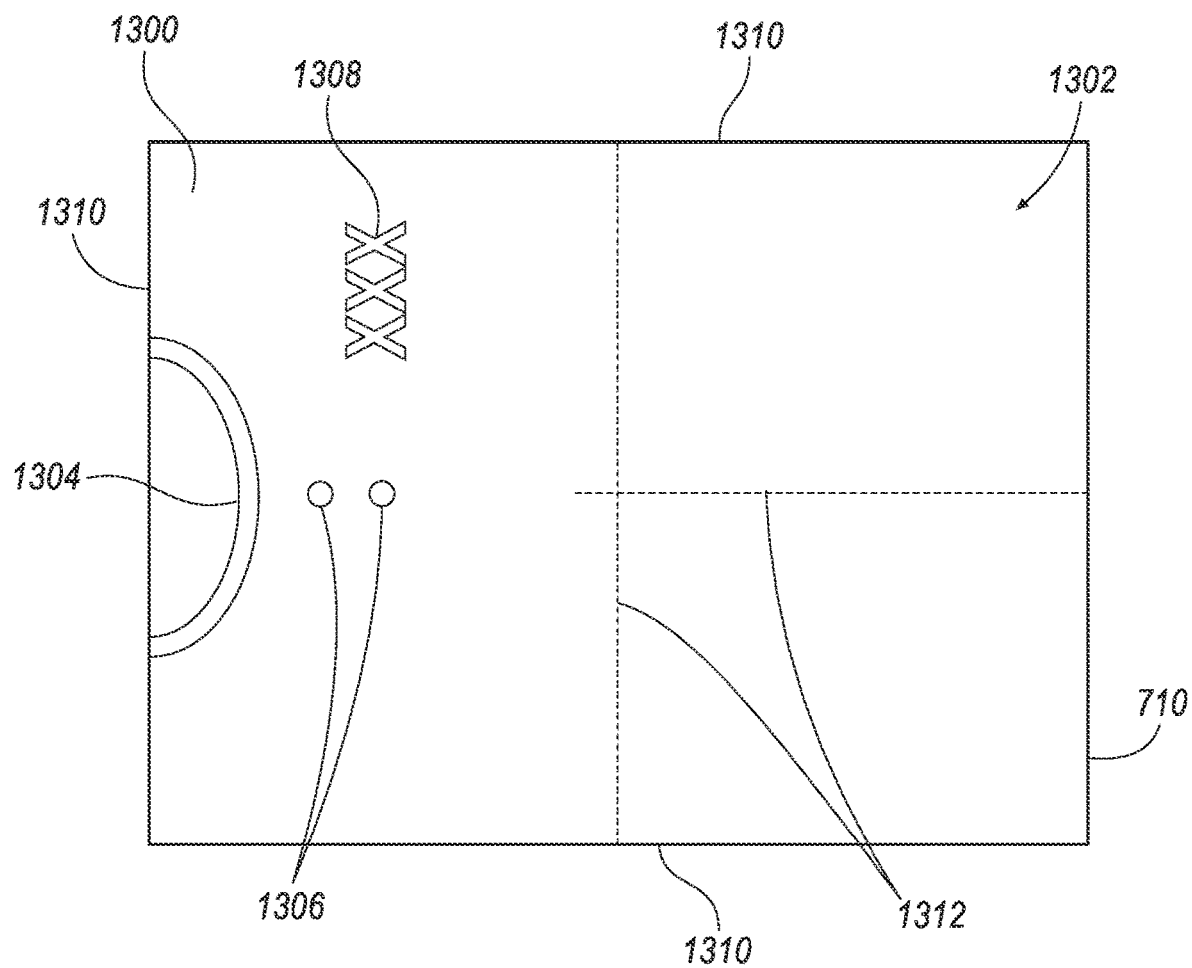
FIG. 13 illustrates reference features on a lower platen according to the disclosure.

FIG. 13 illustrates reference features on a lower platen according to the disclosure. In this example, a lower platen 1300, which may correspond to any of the above lower platens described herein, is shown having a projection image 1302 thereon. Projection image 1302 includes reference features 1304, 1306 for positioning a garment onto the lower platen, and also a projected logo 1308 (illustrated as three X symbols as an example) for positioning an actual logo or transfer onto a garment, with projected logo corresponding 1:1 in size with the actual logo. The references features may include a neckline 1304 for a garment, and/or may include one or more shirt buttons 1306, as examples, but may include any identifying features such as seams around the neck or on a split front that are visible on the garment. The reference features are particular to a type of garment and provide guiding information for where an operator is to position the garment onto the lower platen, such that the garment is properly placed and with respect to a desired location for where the logo or transfer is to be placed. For instance, a T-shirt may have a neckline and no buttons, whereas a "rugby" type shirt may have both a neckline and buttons to work from as reference features. Any number of shirt types, sizes, etc. . . . may be provided in the image and corresponding to any type of logo or transfer, and location thereof, on garment or shirt.

Thus, according to the disclosure, projection head 138/230/232 or projection assemblies 730/732 project the projection image 1302 onto a platen as described in the various systems or transfer presses above, providing guiding or reference features for exact positioning of the shirt onto the lower platen. Projection image 1302 further includes features on the garment as to where to position a logo or transfer. As such, projection image 1302 provides a frame of reference between the lower platen and the garment, and a frame of reference between the garment and the position of the logo.

Still referring to FIG. 13, it may be desirable to provide system calibration ability so that upon arrival and setup of a new machine, mirror and projector locations may be calibrated and then fixed in location so that further adjustment is not necessary. In another example, it may be desirable to provide system calibration prior to each system use, or from time to time to at least check system calibration. Such calibration may include first establishing a reference frame of where the lower platen is located relative to the rest of the system, such as measuring or otherwise establishing a location with respect to one, two, or more of platen edges 1310, or by placement of an image of two cross-hairs 1312 with respect to a fiducial or other marking that is on the lower platen itself. Such operation establishes a reference frame for the image location with respect to the lower platen, which then provides locations as discussed for first positioning the garment or shirt onto the lower platen via imaged features of the garment, and then positioning the projected logo so that the user then can position the actual logo on the desired location on the garment.

In one example, such as that of dual press 700 having projection assemblies 730, 732, not only can system calibration be carried out, but also micro-adjustments for the projection of the image to the lower platen may be further carried out using the disclosed adjustment block 810 for rotational and axial position adjustment of the location of the image.

It may be desirable to provide system calibration ability so that upon arrival and setup of a new machine, mirror and projector locations may be calibrated and then fixed in location so that further adjustment is not necessary. In another example, it may desirable to provide system calibration prior to each system use, or from time to time to at least check system calibration. Such calibration may include first establishing a reference frame of where the lower platen is located, such as measuring or otherwise establishing a location with respect to one, two, or more of platen edges, or by placement of an image of cross-hairs with respect to a fiducial or other marking that is on the lower platen itself. Such operation establishes a reference frame for the image location with respect to the lower platen, which then provides locations as discussed for first positioning the garment or shirt onto the lower platen via imaged features of the garment, and then positioning the projected logo so that the user then can position the actual logo on the desired location on the garment.

Thus, according to the disclosure, a transfer press for applying a transfer to a garment includes an upper platen, a lower platen, a support head adapted to move the upper platen between an open position and a closed position, to apply heat to at least one of the upper platen and the lower platen to apply a transfer to a garment positioned on the lower platen, and a support arm assembly. The projection assembly is attached to the support arm assembly and extends above the lower platen, the projection assembly having a projector positioned to project an image to the lower platen, the image selected to match in size with the transfer to be applied to the garment, to guide a user where to place the transfer onto the garment.

Also according to the disclosure, a method of applying a transfer to a garment includes selecting an image from a database that matches with a transfer that is to be applied to a garment that is positioned on a lower platen, projecting the image toward the lower platen and from a projection assembly that extends above the lower platen, such that a first transfer is positionable to match with a location and size of the image on the first garment, to guide a user where to place the transfer onto the garment, and moving an upper platen to above the lower platen. The method includes closing the upper platen to the lower platen from an open position to a closed position, to apply heat to at least one of the upper platen and the lower platen to apply the transfer to the garment positioned on the lower platen.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. A transfer press for applying a transfer to a garment, comprising:
   an upper platen;
   a lower platen;
   a support head adapted to move the upper platen between an open position and a closed position, to apply heat to the upper platen and/or the lower platen to apply a transfer workpiece to a garment workpiece positioned on the lower platen;
   a support arm assembly; and
   a projection assembly attached to the support arm assembly and extending above the lower platen, the projection assembly including:
     an adjuster;
     a projection frame including a projector portion and a mirror support, the mirror support disposed spaced apart from and connected to the projector portion;
     a projector attached to the projector portion and positioned to project an image to the lower platen, the image selected to match in size with the transfer workpiece, to guide a user where to place the transfer workpiece onto the garment workpiece;
     a mirror mounted on the mirror support and positioned completely forward of the projector such that the projector projects the image forward and directly to the mirror and the mirror reflects the image downward to the lower platen; and
     an enclosure in which the projection frame, the projector, and the mirror are contained;
   wherein the adjuster includes:
     an adjustment block adjustably attached to the projector portion of the projection frame such that the projection frame is rotatable relative to the adjustment block; and
     a rotational adjustment mechanism positioned at least partially within the adjustment block, the rotational adjustment mechanism including a rotational plunger that rotates a rotational gear connected to the projection frame via rotation of a rotational adjustment knob for adjusting a rotational position of the projection frame relative to the adjustment block;
   wherein the adjustment block includes an opening;
   wherein the rotational adjustment mechanism further includes a gear rack positioned in the opening, the gear rack having linear gear teeth;
   wherein the rotational gear is at least partially disposed in the opening of the adjustment block; and
   wherein rotation of the rotational adjustment knob causes a linear motion of the gear rack and the linear gear teeth to engage with the rotational gear to cause the rotation of the rotational gear.

2. The transfer press of claim 1, wherein the support arm assembly is coupled to the lower platen.

3. The transfer press of claim 2, wherein the support arm assembly further includes an adjustment mechanism via which the support arm assembly is movable vertically relative to the lower platen to adjust a height of the projection assembly over the lower platen to enlarge or reduce a size of the image projected from the projection assembly with respect to the lower platen.

4. The transfer press of claim 1, wherein the adjuster further includes a linear adjustment mechanism positioned at least partially within the adjustment block, the linear adjustment mechanism including a linear plunger that moves laterally via rotation of a linear slide knob for adjusting a lateral position of the adjustment block.

5. The transfer press of claim 1, further comprising a controller having a transceiver that is communicatively coupled to a network to receive the image from a database.

6. The transfer press of claim 5, wherein the controller is configured to receive an application instruction particular to the selected image from the database, and wherein the application instruction includes a controlled time, a temperature, and/or a pressure for applying the transfer workpiece to the garment workpiece.

7. The transfer press of claim 1, further comprising:
a second lower platen positioned beside the lower platen;
a second support arm assembly;
a second projection assembly attached to the second support arm assembly and extending above the second lower platen, the second projection assembly including:
a second projection frame including a second projector portion and a second mirror support, the second mirror support disposed spaced apart from and connected to the second projector portion;
a second projector attached to the second projector portion and positioned to project a second image to the second lower platen, the second image selected to match with a second transfer to be applied to a second garment positioned on the second lower platen;
a second mirror mounted on the second mirror support and positioned completely forward of the second projector such that the second projector projects the second image forward and directly to the second mirror and the second mirror reflects the second image downward to the second lower platen; and
a second enclosure in which the second projection frame, the second projector, and the second mirror are contained; and
a drive mechanism to reposition the upper platen and the support head laterally to a first position above the first lower platen and to a second position above the second lower platen.

8. A method of applying a transfer to a garment with the transfer press of claim 1, the method comprising:
selecting the image matching the transfer workpiece from a database;
positioning the garment workpiece on the lower platen of the transfer press;
projecting the image from the projection assembly toward the lower platen such that the transfer workpiece is positionable to match with a location and size of the projected image on the garment workpiece, to guide a user where to place the transfer workpiece onto the garment workpiece, projecting the image from the projection assembly toward the lower platen including projecting, via the projector, the image forward and directly to the mirror and reflecting, via the mirror, the image downward toward the lower platen;
moving the upper platen to a position above the lower platen; and
applying the transfer workpiece to the garment workpiece positioned on the lower platen via moving the upper platen relative to the lower platen from an open position to a closed position and applying heat to the transfer workpiece and/or the garment workpiece via the upper platen and/or the lower platen.

9. The method of claim 8, further comprising adjusting a height of the projection assembly over the lower platen, via moving the support arm assembly relative to the lower platen, to enlarge or reduce a size of the projected image on the garment workpiece with respect to the lower platen.

10. The method of claim 8, further comprising repositioning the projection frame with the adjustment block of the adjuster of the transfer press.

11. The method of claim 10, wherein repositioning the projection frame includes adjusting a linear position of the adjustment block via rotation of a linear slide knob that moves a linear plunger against the adjustment block.

12. The method of claim 10, wherein repositioning the projection frame includes adjusting the rotational position of the adjustment block via rotation of the rotational adjustment knob that moves the rotational plunger to rotate the rotational gear connected to the projection frame.

13. The transfer press of claim 1, wherein the mirror is the only mirror included in the projector assembly such that the image is projected directly from the projector to the mirror and from the mirror directly out of the enclosure toward the lower platen without reflecting from any intervening mirror.

14. The transfer press of claim 1, wherein the enclosure includes:
a transparent panel through which the mirror reflects the image;
a base bracket connected to the transparent panel; and
a cover disposed on and overlaying the transparent panel and the base bracket.

15. The transfer press of claim 14, wherein the projector portion of the projection frame is adjustably connected to the base bracket such that the projection frame is rotatable and translatable relative to the base bracket.

16. The transfer press of claim 14, wherein the transparent panel and the base bracket are disposed laterally adjacent to one another and collectively define an underside of the enclosure that faces the lower platen.

17. The transfer press of claim 16, wherein the support arm assembly is connected to an end of the base bracket opposite the transparent panel.

18. The transfer press of claim 1, wherein the image includes at least one reference feature for positioning the garment onto the lower platen such that the image is projected onto the garment at a predetermined location with a predetermined orientation.

19. The transfer press of claim 1, wherein the projection frame further includes at least one elongated member connecting the mirror support to the projector portion.

20. A transfer press for applying a transfer to a garment, comprising:
an upper platen;
a lower platen;
a support head adapted to move the upper platen between an open position and a closed position, to apply heat to at least one of the upper platen and the lower platen to apply a transfer workpiece to a garment workpiece positioned on the lower platen;
a support arm assembly;
a projection assembly attached to the support arm assembly and extending above the lower platen, the projection assembly including:
a projector positioned to project an image to the lower platen to guide a user where to place the transfer workpiece onto the garment workpiece, the image selected to match in size with the transfer workpiece to be applied to the garment workpiece;

a mirror positioned completely forward of the projector such that the projector projects the image forward and directly to the mirror and the mirror reflects the image downward to the lower platen;

an adjustment block attached to the projector, the adjustment block including an opening;

a rotational adjustment mechanism positioned within the adjustment block, the rotational adjustment mechanism including:
   a rotational plunger that rotates a rotational gear via rotation of a rotational adjustment knob for adjusting a rotational position of the adjustment block; and
   a gear rack having linear gear teeth, the gear rack arranged in the opening of the adjustment block;

wherein rotation of the rotational adjustment knob causes a linear motion of the gear rack and the linear gear teeth to engage with the rotational gear to cause rotation of the rotational gear; and wherein the projection assembly and the mirror are contained within an enclosure.

* * * * *